United States Patent
Guo et al.

(10) Patent No.: US 11,146,735 B2
(45) Date of Patent: Oct. 12, 2021

(54) IMAGE PROCESSING METHODS AND APPARATUSES, COMPUTER READABLE STORAGE MEDIA, AND ELECTRONIC DEVICES

(71) Applicant: Guangdong Oppo Mobile Telecommunications Corp., Ltd., Guangdong (CN)

(72) Inventors: Ziqing Guo, Guangdong (CN); Haitao Zhou, Guangdong (CN); Kamwing Au, Guangdong (CN); Xiao Tan, Guangdong (CN); Guohui Tan, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/666,112

(22) Filed: Oct. 28, 2019

(65) Prior Publication Data

US 2020/0068110 A1 Feb. 27, 2020

Related U.S. Application Data

(63) Continuation of application No. PCT/CN2019/080601, filed on Mar. 29, 2019.

(30) Foreign Application Priority Data

Apr. 28, 2018 (CN) .......................... 201810404831.3
Jun. 28, 2018 (CN) .......................... 201810690949.7

(51) Int. Cl.
*H04N 5/235* (2006.01)
*H04N 5/232* (2006.01)
(Continued)

(52) U.S. Cl.
CPC ............ *H04N 5/2352* (2013.01); *G01K 13/00* (2013.01); *G06T 7/514* (2017.01); *G06T 7/521* (2017.01);
(Continued)

(58) Field of Classification Search
CPC .......... G01K 13/00; G06T 2207/10028; G06T 7/514; G06T 7/521; H04N 5/23229; H04N 5/2352
See application file for complete search history.

(56) References Cited

U.S. PATENT DOCUMENTS

2010/0182614 A1* 7/2010 Kim .................... G01B 11/2441
356/610
2013/0329963 A1 12/2013 Yang et al.
(Continued)

FOREIGN PATENT DOCUMENTS

CN 102970548 A 3/2013
CN 105120257 A 12/2015
(Continued)

OTHER PUBLICATIONS

English translation of Second OA for CN application 201810690949.7 mailed Jun. 17, 2020.
(Continued)

*Primary Examiner* — Obafemi O Sosanya
(74) *Attorney, Agent, or Firm* — Young Basile Hanlon & MacFarlane, P.C.

(57) ABSTRACT

The present disclosure provides an image processing method, an image processing apparatus, a computer readable storage medium, and an electronic device. The method includes: in response to detecting that a camera component is turned on, controlling the camera component to collect a speckle image, the speckle image being an image formed by illuminating an object with laser speckles; detecting a target
(Continued)

temperature of the camera component, and acquiring a corresponding reference image based on the target temperature, the reference image being an image with reference depth information and collected when calibrating the camera component; and calculating based on the speckle image and the reference image to acquire a depth image.

17 Claims, 13 Drawing Sheets

(51) Int. Cl.
  *G06T 7/521* (2017.01)
  *G06T 7/514* (2017.01)
  *G01K 13/00* (2021.01)
(52) U.S. Cl.
  CPC .................. *H04N 5/23229* (2013.01); *G06T 2207/10028* (2013.01)

(56) References Cited

U.S. PATENT DOCUMENTS

| | | | |
|---|---|---|---|
| 2018/0061056 A1* | 3/2018 | Zhao | G06K 9/2036 |
| 2018/0129885 A1* | 5/2018 | Potter | G08B 13/19628 |

FOREIGN PATENT DOCUMENTS

| | | |
|---|---|---|
| CN | 105141939 A | 12/2015 |
| CN | 105407343 B | 8/2017 |
| CN | 104660901 B | 1/2018 |
| CN | 107610127 A | 1/2018 |
| CN | 107657635 A | 2/2018 |
| CN | 107659985 A | 2/2018 |
| CN | 107730561 A | 2/2018 |
| CN | 108073891 A | 5/2018 |
| CN | 108668078 A | 10/2018 |
| CN | 108921903 A | 11/2018 |

OTHER PUBLICATIONS

OA with English translation for CN application 201810404831.3, dated Feb. 14, 2019.
ISR with English translation for PCT application PCT/CN2019/080601, dated Mar. 7, 2019.
OA with English translation for CN application 201810690949.7 dated Feb. 25, 2020.
Notice of Allowance with English translation of OA for CN application 201810690949.7 dated Oct. 15, 2020.
India Examination Report for IN Application 201917049304 dated Feb. 3, 2021. (7 pages).

* cited by examiner

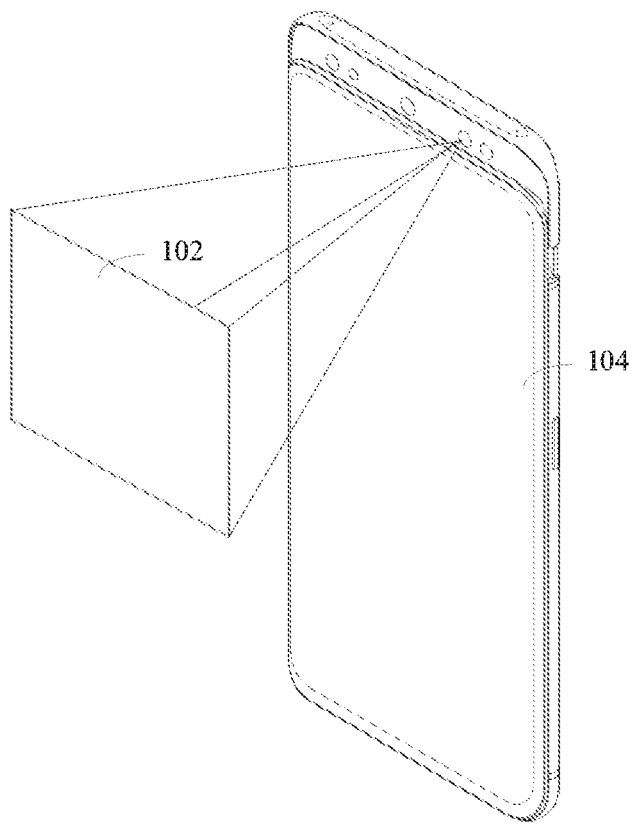

FIG. 1

202 in response to detecting that a camera component is turned on, controlling the camera component to collect a speckle image, the speckle image being an image formed by illuminating an object with laser speckles

204 detecting a target temperature of the camera component, and acquiring a corresponding reference image based on the target temperature, the reference image being an image with reference depth information and collected when calibrating the camera component

206 calculating based on the speckle image and the reference image to acquire a depth image

FIG. 2

302 — in response to a first processing unit detecting an image acquisition instruction, acquiring a timestamp carried in the image acquisition instruction, the timestamp being configured to indicate a time when the image acquisition instruction is initiated 304 — controlling the camera component to turn on in response to that a duration from the timestamp to a target time is less than a duration threshold, the target time being configured to indicate a time when the image acquisition instruction is detected 306 — in response to detecting that a camera component is turned on, controlling the camera component to collect a speckle image, the speckle image being an image formed by illuminating an object with laser speckles 308 — acquiring by a second processing unit, the target temperature of the camera component, and transmitting by the second processing, the target temperature to a first processing unit 310 — acquiring by the first processing unit, the corresponding reference image based on the target temperature 312 — comparing the reference image with the speckle image to acquire offset information for indicating a horizontal offset of a speckle in the speckle image relative to a corresponding speckle in the reference image 314 — calculating based on the offset information and the reference depth information to acquire the depth image

502 acquiring an application level corresponding to a target application that initiates the image acquisition instruction, and adjusting an accuracy of the depth image based on the application level to acquire an adjusted depth image

504 transmitting the adjusted depth image to the target application

1102 — inputting at least two PWMs with different frequencies, and controlling the temperature of the light emitter to reach the at least two different specified temperatures by the at least two PWMs 1104 — controlling the camera to collect the reference image generated when the light emitter illuminates a reference plane at the specified temperature 1106 — establishing a correspondence between the specified temperature and the reference image, and writing the specified temperature and the reference image into a secure execution environment of the terminal for storage 1108 — controlling a camera module to collect a speckle image in response to detecting that the camera module is turned on 1110 — detecting a target temperature of the camera module 1112 — acquiring the corresponding reference image based on the target temperature, and calculating based on the speckle image and the reference image to acquire a depth image

FIG. 11

IMAGE PROCESSING METHODS AND APPARATUSES, COMPUTER READABLE STORAGE MEDIA, AND ELECTRONIC DEVICES

CROSS-REFERENCE TO RELATED APPLICATION(S)

This application is a continuation application of International Application No. PCT/CN2019/080601, filed on Mar. 29, 2019, which claims priority to Chinese Patent Application No. 201810404831.3, filed on Apr. 28, 2018, and Chinese Patent Application No. 201810690949.7, filed on Jun. 28, 2018, the entire contents of all of which are incorporated herein by reference in their entireties.

TECHNICAL FIELD

The present disclosure relates to the field of computer technologies, and more particularly, to an image processing method, an image processing apparatus, a computer readable storage medium, and an electronic device.

BACKGROUND

Intelligent device integration is applied more and more extensively. For example, a user may employ an intelligent device to take photos, pay, and the like. The intelligent device may collect depth information of an object to be photographed through structured light, and perform operations such as beauty, unlocking, and payment based on the collected depth information. In a process of taking photos, a temperature of a camera of the intelligent device may change due to long hours of operating.

SUMMARY

An image processing method includes: in response to detecting that a camera component is turned on, controlling the camera component to collect a speckle image of an object that is illuminated with laser speckles; detecting a current temperature of the camera component; acquiring a reference image with reference depth information based on the current temperature and a preset correspondence between reference images and specified temperatures; and calculating based on the speckle image and the acquired reference image to acquire a depth image.

A computer readable storage medium has stored thereon computer programs executed by a processor to carry out the above method.

An electronic device includes a memory and a processor. The memory may store computer readable instructions. The instructions are executed by the processor, to cause the processor to perform the above method.

BRIEF DESCRIPTION OF DRAWINGS

In order to clearly illustrate embodiments of the present disclosure or technical solutions in the prior art, a brief description of drawings used in embodiments or in the prior art descriptions is given below. Obviously, the drawings in the following descriptions are only part embodiments of the present disclosure, and for those skilled in the art, other drawings may be obtained based on these drawings without creative labor.

FIG. 1 illustrates a scenario diagram of an image processing method according to an embodiment of the present disclosure.

FIG. 2 illustrates a flowchart of an image processing method according to an embodiment of the present disclosure.

FIG. 3 illustrates a flowchart of an image processing method according to an embodiment of the present disclosure.

FIG. 11 illustrates a flowchart of an image processing method according to an embodiment of the present disclosure.

DETAILED DESCRIPTION

Figures 4, 5:
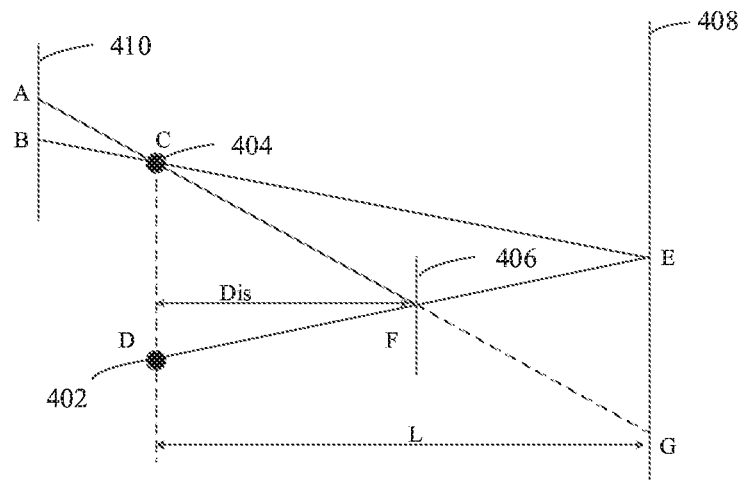
FIG. 4 illustrates a schematic diagram of calculating depth information according to an embodiment of the present disclosure.
FIG. 5 illustrates a flowchart of an image processing method according to an embodiment of the present disclosure.

In order to make the objectives, technical solutions, and advantages of the present disclosure more comprehensible, the present disclosure will be further described in detail below with reference to the accompanying drawings and embodiments. It is understood that the specific embodiments described herein are merely illustrative of the disclosure and are not intended to be limiting.

It is to be understood that although terms such as "first" and "second" are used herein for describing various elements, these elements should not be limited by these terms. These terms are only used for distinguishing one element from another element. For example, a first client may also be called a second client, and similarly, the second client may also be called the first client, without departing from the scope of the present disclosure. The first client and the second client are both a client, but are not the same client.

FIG. 1 illustrates a scenario diagram of an image processing method according to an embodiment of the present disclosure. As illustrated in FIG. 1, a scenario may include an electronic device 104. A camera component may be mounted on the electronic device 104. Various applications may be installed in the electronic device 104. The electronic device 104 may detect an image acquisition instruction and control the camera component to turn on. The camera component is controlled to collect a speckle image 102 in response to detecting that the camera component is turned on. The speckle image 102 is an image formed by illuminating an object with laser speckles. A target temperature of the camera component is detected. A corresponding reference image is acquired based on the target temperature. The reference image is an image with reference depth information and collected when calibrating the camera component. It is calculated based on the speckle image 102 and the reference image to acquire a depth image. The electronic device 104 may be a smart phone, a tablet computer, a personal digital assistant, a wearable device, or the like.

FIG. 2 illustrates a flowchart of an image processing method according to an embodiment of the present disclosure. As illustrated in FIG. 2, the image processing method may include acts in block 202 to block 206.

At block 202, in response to detecting that a camera component is turned on, the camera component is controlled to collect a speckle image. The speckle image is an image formed by illuminating an object with laser speckles.

In one embodiment, a camera may be mounted on the electronic device. Images may be acquired by the mounted camera. The camera may be a laser camera, a visible-light camera, and the like, which is varied with different acquired images. The laser camera may acquire an image formed when laser light illuminates onto the object. The visible-light camera may acquire an image formed when visible light illuminates onto the object. The electronic device may be mounted with several cameras, and the corresponding mounted locations are not limited. For example, a camera may be mounted on a front panel of the electronic device, and two cameras may be mounted on a rear panel of the electronic device. The camera may also be mounted in an interior of the electronic device in an in-line manner, which may be turned on by rotating or sliding. In detail, a front camera and a rear camera may be mounded on the electronic device, and the front camera and the rear camera may acquire images from different angles of view. Generally, the front camera may acquire images from the front view of the electronic device, and the rear camera may acquire images from the rear view of the electronic device.

A processing unit of the electronic device may receive instructions from upper-layer applications. When the processing unit receives the image acquisition instruction, the camera component may be controlled to operate, and the speckle image may be collected by the camera. The processing unit is coupled to the camera. The camera may transmit the acquired image to the processing unit. The acquired image may be processed by the processing unit such as cropping, brightness adjustment, face detection, face recognition, and the like. In detail, the camera component may include, but be not limited to, a laser camera and a laser lamp. When the processing unit receives the image acquisition instruction, the processing unit controls the laser lamp to operate. When the laser lamp is turned on, the speckle image is collected by the laser camera.

It is to be understood that when the laser light illuminates an optically-rough surface whose average fluctuation is greater than an order of magnitude of wavelength, sub-waves scattered by surface elements randomly-distributed on the surface may superimpose with each other, to cause a reflected light field to have a random spatial light intensity distribution showing Granular structure. That is the laser speckles. The laser speckles formed are highly random. Therefore, the laser speckles formed by the laser light emitted from different laser emitters are different. When the laser speckles formed illuminate onto objects of different depths and shapes, the generated speckle images are different. The laser speckles formed by the laser emitter is unique, so that the acquired speckle image is also unique. The laser speckles formed by the laser lamp may illuminate onto the object, and then the speckle image formed when the laser speckles illuminate onto the object may be collected by the laser camera.

The image acquisition instruction refers to an instruction for triggering an image acquisition operation. For example, when the user unlocks the smart phone, unlocking verification may be performed by acquiring a face image, and the upper-layer application may initiate the image acquisition instruction and control the camera component to collect images based on the image acquisition instruction. In detail, a first processing unit may receive the image acquisition instruction initiated by the upper-layer application. When the first processing unit detects the image acquisition instruction, the camera component may be controlled to be turned on, and to collect the speckle image. The speckle image collected by the camera component may be transmitted to the first processing unit, and the first processing unit processes the speckle image.

At block 204, a target temperature of the camera component is detected, and a corresponding reference image is acquired based on the target temperature. The reference image is an image with reference depth information and collected when calibrating the camera component.

In the embodiment provided in the present disclosure, the laser lamp may emit a plurality of laser speckles. When the plurality of laser speckles illuminate onto objects of different distances, the spots presented on the image have different positions. The electronic device may pre-collect a standard reference image, which is an image formed when the plurality of laser speckles illuminates onto a plane. Therefore, the spots on the reference image are generally evenly distributed, and the correspondence between each spot in the reference image and a corresponding reference depth is established. It may be understood that the spots on the reference image may not be evenly distributed, which is not limited herein.

The camera component may become hot when the electronic device capturing. Changes in temperature may cause deformation of the camera component, and may also cause changes in collecting parameters, so that the acquired reference image will change accordingly. Therefore, when the electronic device collects the reference image, the camera component may be controlled to operate at different temperatures, and then the reference images may be acquired by the camera at different temperatures. After the reference images are acquired, the electronic device associates the collected reference images with the temperatures of the camera component, and stores the reference images and the temperatures of the camera component. When the image is collected, the corresponding reference image is acquired based on the temperature of the camera component.

At block 206, it is calculated based on the speckle image and the reference image to acquire a depth image.

When the depth image needs to be acquired, the electronic device controls the laser lamp to emit laser speckles. After the laser speckles illuminate onto the object, the speckle image is collected by the laser camera, and the depth image is calculated from the speckle image and the reference image. In detail, in the process of calculating the depth information based on the speckle image, a relative depth is first calculated based on a position offset of spots in the speckle image relative to the reference image, and the relative depth may represent the depth information of the actually-photographed object to the reference plane. Then, the actual depth information of the object is calculated based on the acquired relative depth and the reference depth. The depth image is configured to represent the depth information corresponding to the infrared image, and may be the relative depth of the represented object to the reference plane, or the absolute depth of the object to the camera.

In detail, the depth image may be calculated based on the speckle image and the reference image in the first processing unit. After the first processing unit acquires the depth image, the depth image may be directly transmitted to the application that initiates the image acquisition instruction. The depth image may also be transmitted to a second processing unit. The second processing unit performs the next processing based on the depth image. After the second processing unit finishes the processing, the processing result is transmitted to the application that initiates the image acquisition instruction.

When the temperature of the camera changes, the camera may be deformed, which may affect the collecting parameters of the camera, resulting in a very large error in image processing during collecting. The image processing method provided in the above embodiment may control the camera component to collect the speckle image when detecting that the camera component is turned on. Then, the temperature of the camera component is detected, and the reference image is acquired based on the temperature of the camera component. Finally, based on the acquired speckle image and the reference image, the depth image is acquired. This allows that the reference image vary with the temperature. The depth images may be calculated based on the corresponding reference images at different temperatures, thereby reducing image errors caused by temperature changes and improving the accuracy of image processing.

FIG. 3 illustrates a flowchart of an image processing method according to an embodiment of the present disclosure. As illustrated in FIG. 3, the image processing method may include acts in block 302 to block 314.

At block 302, in response to a first processing unit detecting an image acquisition instruction, a timestamp carried in the image acquisition instruction is acquired. The timestamp is configured to indicate a time when the image acquisition instruction is initiated.

In detail, the electronic device may include the first processing unit and the second processing unit. The first processing unit and the second processing unit operate in a secure execution environment. The secure execution environment may include a first secure execution environment and a second secure execution environment. The first processing unit may operate in the first secure execution environment. The second processing unit may operate in the second secure execution environment. The first processing unit and the second processing unit are processing units distributed on different processors and are in different secure execution environments. For example, the first processing unit may be an external MCU (Microcontroller Unit) module, or a security processing module in a DSP (Digital Signal Processing). The second processing unit may be a CPU (Central Processing Unit) core under TEE (Trust Execution Environment).

The CPU in the electronic device has two operating modes, i.e., TEE and REE (Rich Execution Environment). Normally, the CPU runs under REE. However, when the electronic device needs to acquire data with higher security level, for example, when the electronic device needs to acquire face data for identification and verification, the CPU may be switched from REE to TEE for operation. When the CPU in the electronic device is a single core, the single core may be directly switched from REE to TEE. When the CPU in the electronic device is multi-core, the electronic device switches one core from REE to TEE, and the other cores still run in the REE.

When the application generates the image acquisition instruction, a timestamp may be written into the image acquisition instruction, which is configured to record a time when the application initiates the image acquisition instruction. When the first processing unit receives the image acquisition instruction, the first processing unit may acquire the timestamp from the image acquisition instruction, and determine the time at which the image acquisition instruction is generated based on the timestamp. For example, when the application initiates the image acquisition instruction, the application may read the time recorded by the electronic device's clock as the timestamp and write the acquired timestamp to the image acquisition instruction. For example, in Android system, the system time may be acquired through a function, i.e., System.currentTimeMillis( ).

At block 304, the camera component is controlled to turn on in response to that a duration from the timestamp to a target time is less than a duration threshold. The target time is configured to indicate a time when the image acquisition instruction is detected.

The target time refers to the time when the electronic device detects the image capturing instruction. In detail, it refers to the time when the first processing unit detects the image capturing instruction. The duration from the timestamp to the target time refers to a duration from a time when the image acquisition instruction is initiated to a time when the electronic device detects the image acquisition instruction. If the duration exceeds the duration threshold, it is considered that the response of the instruction is abnormal, and the acquisition of the image may be stopped, and an exception message is returned to the application. If the duration is less than the duration threshold, the camera is controlled to collect the speckle image.

At block 306, in response to detecting that a camera component is turned on, the camera component is controlled to collect a speckle image. The speckle image is an image formed by illuminating an object with laser speckles.

In one embodiment, the camera component may collect an infrared image while collecting the speckle image. The infrared image may represent detailed information of the object to be photographed, and the depth information of the object to be photographed may be acquired based on the speckle image. The camera component may include a first camera component and a second camera component. The first camera component is configured to collect infrared images. The second camera component is configured to collect speckle images. The infrared image and the speckle image collected by the electronic device need to correspond to each other, and the camera component needs to be controlled to simultaneously collect the infrared image and the speckle image. In detail, based on the image capturing instruction, the first camera component is controlled to collect the infrared image and the second camera component is controlled to collect the speckle image. An interval between a first time of acquiring the infrared image, and a second time of acquiring the speckle image is less than a first threshold.

The first camera component may include a floodlight and a laser camera. The second camera component may include a laser lamp and a laser camera. The laser camera of the first camera component and the laser camera of the second camera component may be the same laser camera, or different laser cameras, which is not limited here. When the first processing unit receives the image acquisition instruction, the first processing unit controls the first camera component and the second camera component to operate. The first camera component and the second camera component may operate in parallel or in a time-sharing manner, and the order of operating is not limited. For example, the first camera component may be first controlled to collect infrared images, or the second camera component may be first controlled to collect speckle images.

It is to be understood that the infrared image and the speckle image are corresponding, and it is necessary to ensure the consistency of the infrared image and the speckle image. Assuming that the first camera component and the second camera component operate in the time-sharing manner, it is necessary to ensure that a time interval between the acquisition of the infrared image and the acquisition of the speckle image is very short. The time interval between the first time at which the infrared image is acquired and the second time at which the speckle image is acquired is less than a first threshold. The first threshold is generally a relatively small value. When the time interval is less than the first threshold, the object to be photographed is considered to have not changed, and the acquired infrared image and speckle image are corresponding. It is to be understood that the adjustment may be made based on the changing rule of the object to be photographed. The faster the object to be photographed changes, the smaller the first threshold corresponding to the acquisition. The first threshold may be set to a larger value assuming that the object to be photographed is in a stationary state for a long period of time. In detail, a speed of change of the object to be photographed is acquired, and the corresponding first threshold is acquired based on the speed of change.

For example, when the mobile phone needs to be authenticated and unlocked by the face, the user may click an unlocking button to initiate an unlocking instruction, and point a front camera to the face for capturing. The mobile phone transmits the unlocking instruction to the first processing unit, and the first processing unit controls the camera to operate. Firstly, the infrared image is collected by the first camera component, and after the interval of 1 millisecond, the second camera component is controlled to collect the speckle image. The acquired infrared image and speckle image are employed for authentication and unlocking.

Further, the camera component is controlled to collect the infrared image at the first time, and the camera component is controlled to collect the speckle image at the second time. The time interval between the first time and the target time is less than a second threshold. The time interval between the second time and the target time is less than a third threshold. If the time interval between the first time and the target time is less than the second threshold, the camera component is controlled to collect the infrared image. If the time interval between the first time and the target time is greater than the second threshold, a prompt message of response timeout may be returned to the application, and it waits for the application to re-initiate the image acquisition instruction.

After the camera component collects the infrared image, the first processing unit may control the camera component to collect the speckle image. The time interval between the second time of collecting the speckle image and the first time is less than the first threshold, and the time interval between the second time and the target time is less than the third threshold. If the time interval between the second time and the first time is greater than the first threshold, or the time interval between the second time and the target time is greater than the third threshold, a prompt message of response timeout may be returned to the application, and it waits for the application to re-initiate the image acquisition instruction. It is to be understood that the second time of collecting the speckle image may be greater than the first time of collecting the infrared image, or may be smaller than the first time of collecting the infrared image, which is not limited herein.

In detail, the electronic device may be equipped with a floodlight controller and a laser lamp controller. The first processing unit is coupled to the floodlight controller and the laser lamp controller through two PWM (Pulse Width Modulation) paths. When the first processing unit needs to control the floodlight to turn on or control the laser lamp to turn on, a pulse wave may be transmitted to the floodlight controller by the PWM to control the floodlight to turn on, or a pulse wave may be transmitted to the laser lamp controller to control the laser lamp to turn on. Pulse waves may be transmitted to the two controllers to control the time interval between acquiring the infrared image and acquiring the speckle image. The time interval between the acquired infrared image and the acquired speckle image is lower than the first threshold, which ensures the consistency of the acquired infrared image and the acquired speckle image, and avoids a large error between the infrared image and the speckle image, improving the accuracy of image processing.

At block 308, the second processing unit acquires a target temperature of the camera component and transmits the target temperature to the first processing unit.

The second processing unit is coupled to the first processing unit. The electronic device may acquire the target temperature of the camera component when collecting the speckle image by employing a temperature sensor, and transmit the acquired target temperature to the second processing unit. After receiving the target temperature, the second processing unit may directly transmit the target temperature to the first processing unit. It is to be understood that the camera component generally continuously collects the speckle images when the camera component is turned on. Then, in the process of collecting the speckle image, the electronic device may acquire the target temperature of the first camera component through the second processing unit every time the speckle image is acquired, and transmit the target temperature to the first processing unit. Or a change of temperature of the camera component may also be detected in real time based on the acquired target temperatures. When the change of temperature of the camera component is greater than a certain value, the target temperature is transmitted to the first processing unit.

In detail, the second processing unit may acquire the current target temperature of the camera component, and compare the acquired target temperature with the reference target temperature transmitted to the first processing unit last time. If a difference between the current target temperature and the reference target temperature is greater than a temperature threshold, the current target temperature is transmitted to the first processing unit. The first processing unit acquires a corresponding reference image based on the received current target temperature. For example, after the camera component is turned on, the speckle images are continuously collected by the camera component. The temperature sensor detects the target temperature of the camera component each time the speckle image is collected. It is assumed that the target temperature currently collected is 20° C. (Degree Celsius), the target temperature transmitted to the first processing unit last time is 30° C., and the temperature threshold is 5° C. The difference between the currently-collected target temperature and the target temperature transmitted to the first processing unit last time is 10° C. Then, the difference exceeds the above temperature threshold. The second processing unit may transmit the currently-collected target temperature of 20° C. to the first processing unit.

At block 310, the first processing unit acquires a corresponding reference image based on the target temperature.

In the embodiment provided in the present disclosure, when the camera component is calibrated, a reference image formed when the laser speckles illuminate onto the object with a fixed depth is collected by the camera component. Later, during the collecting process, the collected speckle image may be compared with the reference image, and the depth information corresponding to the speckle image is calculated. Since the temperature causes the camera component to change, it is necessary to control the camera component to collect the reference images at different temperatures, so that the reference image acquired is more accurate. In detail, when calibrating the camera component, the temperature of the camera component is controlled to reach a specified temperature; the camera component is controlled to collect a reference image at the specified temperature; and a corresponding relationship between the specified temperature and the reference image is established.

The reference image collected by the electronic device may be stored in the first processing unit. Since the first processing unit is located at a secure execution environment, the security of processing images may be ensured. The act of acquiring the reference image based on the target temperature includes: acquiring a difference between the target temperature and each specified temperature, and acquiring the reference image corresponding to the specified temperature with the smallest difference. For example, if the specified temperatures pre-acquired by the electronic device are 30° C., 60° C., and 90° C., and if the currently-acquired target temperature of the camera component is 25° C., differences between each specified temperature and the target temperature are 5° C., 35° C. and 65° C. Accordingly, the specified temperature with the smallest difference is 30° C. The first processing unit acquires the corresponding reference image when the specified temperature is 30° C.

In detail, a method of acquiring the corresponding reference image based on the target temperature may include: acquiring an identifier of the camera component, and acquiring the corresponding reference image based on the target temperature and the identifier. The correspondence among the target temperature, the identifier of the camera component, and the reference image may also be stored in the electronic device. The identifier of the camera component is configured to uniquely indicate one camera component. Each camera component uniquely corresponds to one identifier. The corresponding camera component may be searched based on the identifier of the camera component. Since each camera component is unique, the reference images acquired by different camera components are also different. Therefore, when calibrating, the collected reference image and target temperature may be associated with the identifier of the camera component.

At block 312, the reference image is compared with the speckle image to acquire offset information for indicating a horizontal offset of a speckle in the speckle image relative to a corresponding speckle in the reference image.

In one embodiment, each pixel point (x, y) in the speckle image is traversed as follows. A pixel block of predetermined size is selected centering on the pixel point. For example, it is possible to select a pixel block of 31 pixels*31 pixels. Then a matched pixel block may be searched in the reference image. A horizontal offset of coordinates of the matched pixel point in the reference image and coordinates of the pixel point (x, y), in which shifting to right is denoted as positive, shifting to left is denoted as negative, may be calculated. The calculated horizontal offset is brought into formula (1) to acquire depth information of the pixel point (x, y). By sequentially calculating depth information of each pixel in the speckle image, the depth information corresponding to each pixel in the speckle image may be acquired.

At block 314, based on the offset information and the reference depth information, it is calculated to acquire the depth image.

The depth image may be configured to represent depth information corresponding to the photographed object. Each pixel included in the depth image represents one depth information. In detail, each of spots in the reference image corresponds to one reference depth information. After acquiring the horizontal offset of the spots in the reference image and the spots in the speckle image, the relative depth information of the object in the speckle image to the reference plane may be calculated based on the horizontal offset. The actual depth information of the object to the camera may be calculated based on the relative depth information and the reference depth information. That is, the final depth image is acquired.

FIG. 4 illustrates a schematic diagram of calculating depth information according to an embodiment of the present disclosure. As illustrated in FIG. 4, the laser lamp 402 may generate laser speckles. The laser speckles are reflected by the object and are captured by the laser camera 404 to acquire the image. During calibrating the camera, the laser speckles emitted by the laser lamp 402 are reflected by the reference plane 408. The reflected light is collected by the laser camera 404. The imaging plane 410 is imaged to acquire the reference image. The reference plane 408 to the laser lamp 402 has a reference depth of L, which is known. In a process of actually calculating the depth information, the laser speckles emitted by the laser lamp 402 are reflected by the object 406, and the reflected light is collected by the laser camera 404. The imaging plane 410 may be imaged to acquire the actual speckle image. Then the actual depth information may be calculated by a formula of:

$$Dis = \frac{CD \times L \times f}{L \times AB \times CD \times f}. \quad (1)$$

wherein L represents a distance between the laser lamp 402 and the reference plane 408, f represents a focal length of a lens in the laser camera 404, CD represents a distance between the laser lamp 402 and the laser camera 404, and AB represents an offset distance between the imaging of the object 406 and the imaging of the reference plane 408. AB may be a product of the pixel offset n and an actual distance p of the pixel. When the distance D is between the object 406 and the laser lamp 402 is greater than the distance L between the reference plane 408 and the laser lamp 402, AB is a negative value. When the distance Dis between the object 406 and the laser lamp 402 is less than the distance L between the reference plane 408 and the laser lamp 402, AB is a positive value.

In one embodiment, after the depth image is acquired, the depth image may also be corrected to acquire a corrected depth image. Correcting the depth image means correcting internal and external parameters in the depth image. For example, in the camera component, a visible-light image may be acquired by a visible-light camera. A speckle image may be acquired by a laser camera. Since positions of the visible-light camera and the laser camera are different, it is necessary to align the visible-light image and the speckle image to ensure that the visible-light image and the speckle image are corresponding. That is, when capturing the depth image, it is necessary to correct an error caused by deflection parallax, thereby acquiring a standard depth image. In detail, a depth parallax image may be calculated based on the depth image, and the internal and external parameter correction is performed based on the depth parallax image to acquire a corrected depth image.

In embodiments provided in the present disclosure, after acquiring the depth image, the depth image may also be transmitted to an upper-layer application, as acts in the following blocks.

At block 502, an application level corresponding to a target application that initiates the image acquisition instruction is acquired, and an accuracy of the depth image is adjusted based on the application level to acquire an adjusted depth image.

At block 504, the adjusted depth image is transmitted to the target application.

The application level may represent an importance level corresponding to the target application. Typically, the higher the application level of the target application, the higher the accuracy of the transmitted image. The electronic device may preset the application levels of the applications and establish a correspondence between application levels and accuracy levels. The corresponding accuracy level may be acquired based on the application level. In detail, the application level corresponding to the target application that initiates the image acquisition instruction is acquired, and the corresponding accuracy level is acquired based on the application level; and the accuracy of the depth image is adjusted based on the accuracy level, and the adjusted depth image is transmitted to the target application. For example, the applications may be divided into four application levels: system security applications, system non-security applications, third-party security applications, and third-party non-security applications. The corresponding accuracy levels are gradually reduced accordingly.

The accuracy of the depth image may be expressed as the resolution of the image, or the number of spots contained in the speckle image, so that the accuracy of the depth image acquired from the speckle image is also different. In detail, adjusting the image accuracy may include: adjusting a resolution of the depth image based on the accuracy level; or adjusting the number of spots included in the collected speckle image based on the accuracy level, and calculating the adjusted depth image based on the adjusted speckle image. The number of spots included in the speckle image may be adjusted by software or by hardware. When the software is employed, the spots in the collected speckle pattern may be directly detected, and some spots are combined or eliminated, so that the number of spots contained in the adjusted speckle image is reduced. When the hardware is employed, the number of spots generated by the diffraction of the laser lamp. For example, when the accuracy is high, the number of generated laser speckles is 30,000. When the accuracy is low, the number of generated laser speckles is 20,000. Thus, the accuracy of the corresponding depth image is correspondingly reduced.

In detail, different diffractive optical elements (DOE) may be preset in the laser lamp. The number of laser speckles formed by different DOE diffraction is different. The DOEs may be switched based on the accuracy level to generate a speckle image, and a depth map with different accuracy may be acquired based on the acquired speckle image. When the application level of the application is high, the corresponding accuracy level is also relatively high. The laser lamp may control the DOE with the large number of laser speckles to emit the laser speckles, thereby acquiring a speckle image with the large number of spots. When the application level of the application is low, the corresponding accuracy level is also low. The laser lamp may control the DOE with the small number of laser speckles to emit the laser speckles, thereby acquiring a speckle image with the small number of spots.

In one embodiment, before transmitting the depth image to the target application, the depth image may be encrypted. In detail, the depth image is encrypted, and the encrypted depth image is transmitted to the target application that initiates the image acquisition instruction. The depth image is encrypted, and the specific encryption algorithm is not limited herein. For example, it may be based on DES (Data Encryption Standard), MD5 (Message-Digest Algorithm 5), and HAVAL (Diffie-Hellman).

The manner of encrypting the depth image may include: acquiring a network security level of a network environment located currently by the electronic device; acquiring an encryption level based on the network security level; and performing encryption processing corresponding to the encryption level on the depth image. When an application acquires an image for operation, it generally needs to be networked. For example, when the face is subjected to payment authentication, the depth image may be transmitted to the application, and the application transmits it to a corresponding server to complete the corresponding payment operation. When the application transmits the depth image, it needs to connect to the network, and then transmit the depth image to the corresponding server through the network. Therefore, when transmitting the depth image, the depth image may be first encrypted. The network security level of the network environment located currently by the electronic device may be detected, and the encryption processing may be performed based on the network security level. The lower the network security level, the lower the security of the network environment is, and the higher the encryption level is. The electronic device may pre-establish a correspondence between network security levels and encryption levels. The corresponding encryption level may be acquired based on the network security level, and the depth image may be encrypted based on the encryption level.

In the embodiments provided in the present disclosure, the depth image may be encrypted based on the acquired reference image. The reference image is a speckle image collected by the electronic device when calibrating the camera component. Since the reference image is highly unique, the reference images acquired by different electronic devices are different. Therefore, the reference image itself may be employed as an encryption key to encrypt the data. The electronic device may store the reference image in a secure environment to prevent data leakage. In detail, the acquired reference image is composed of a two-dimensional matrix of pixels, and each pixel has a corresponding pixel value. A face recognition result may be encrypted based on all or part of the pixels of the reference image. For example, the reference image may be directly superimposed with the depth image to acquire an encrypted image. A pixel matrix corresponding to the depth image may be multiplied by the pixel matrix corresponding to the reference image to acquire an encrypted image. The pixel values corresponding to one or more pixels in the reference image may be employed as an encryption key to encrypt the depth image. The specific encryption algorithm is not limited in this embodiment.

The reference image may be generated when calibrating the electronic device, and the electronic device may pre-store the reference image in a secure execution environment. When the depth image needs to be encrypted, the reference image may be read in a secure execution environment, and the depth image may be encrypted based on the reference image. At the same time, the same reference image is stored on the server corresponding to the target application. After the electronic device transmits the encrypted depth image to the server corresponding to the target application, the server of the target application acquires the reference image and decrypts the encrypted depth image based on the acquired reference image.

It should be understood that, the reference images collected by different electronic devices may be stored in the server of the target application, and the reference image corresponding to each electronic device is different. Therefore, the server may define an identifier for each reference image, and store an identifier of the electronic device, and establish a correspondence between identifiers of reference images and identifiers of electronic devices. When the server receives the depth image, the received depth image will simultaneously carry the identifier of the electronic device. The server may search for the identifier of the corresponding reference image based on the identifier of the electronic device, and search for the corresponding reference image based on the identifier of the corresponding reference image, and decrypt the depth image based on the searched reference image In other embodiments provided in the present disclosure, the manner of performing the encryption based on the reference image may include: acquiring a pixel matrix corresponding to the reference image, acquiring an encryption key based on the pixel matrix; and performing the encryption on the depth image based on the encryption key. The reference image is composed of a two-dimensional matrix of pixels. Since the acquired reference image is unique, the pixel matrix corresponding to the reference image is also unique. The pixel matrix itself may be employed as an encryption key to encrypt the depth image, or may be converted to acquire an encryption key to encrypt the depth image based on the converted encryption key. For example, a pixel matrix is a two-dimensional matrix composed of a plurality of pixel values, and a position of each pixel value in the pixel matrix may be represented by a two-dimensional coordinate. The corresponding pixel values may be acquired by one or more position coordinates. The one or more pixel values acquired may be combined into an encryption key. After the encryption key is acquired, the depth image may be encrypted based on the encryption key. In detail, the encryption algorithm is not limited in this embodiment. For example, the encryption key may be directly superimposed or multiplied with the data, or the encryption key may be inserted into the data as a value to acquire the final encrypted data.

The electronic device may employ different encryption algorithms for different applications. In detail, the electronic device may pre-establish a correspondence between identifiers of applications and encryption algorithms. The image acquisition instruction may include the identifier of the target application. After receiving the image acquisition instruction, the identifier of the target application included in the image acquisition instruction may be acquired, and the corresponding encryption algorithm may be acquired based on the identifier of the target application. The depth image is encrypted based on the acquired encryption algorithm.

With the image processing method provided in the above embodiments, the camera component may be controlled to collect the speckle image in response to detecting that the camera component is turned on. The temperature of the camera component is detected. The reference image is acquired based on the temperature of the camera component. Based on the acquired speckle image and the reference image, the depth image is acquired. This allows different reference images to be taken at different temperatures. The depth images are calculated based on the corresponding reference images at different temperatures, thereby reducing image errors caused by temperature changes and improving the accuracy of image processing.

Figure 6:
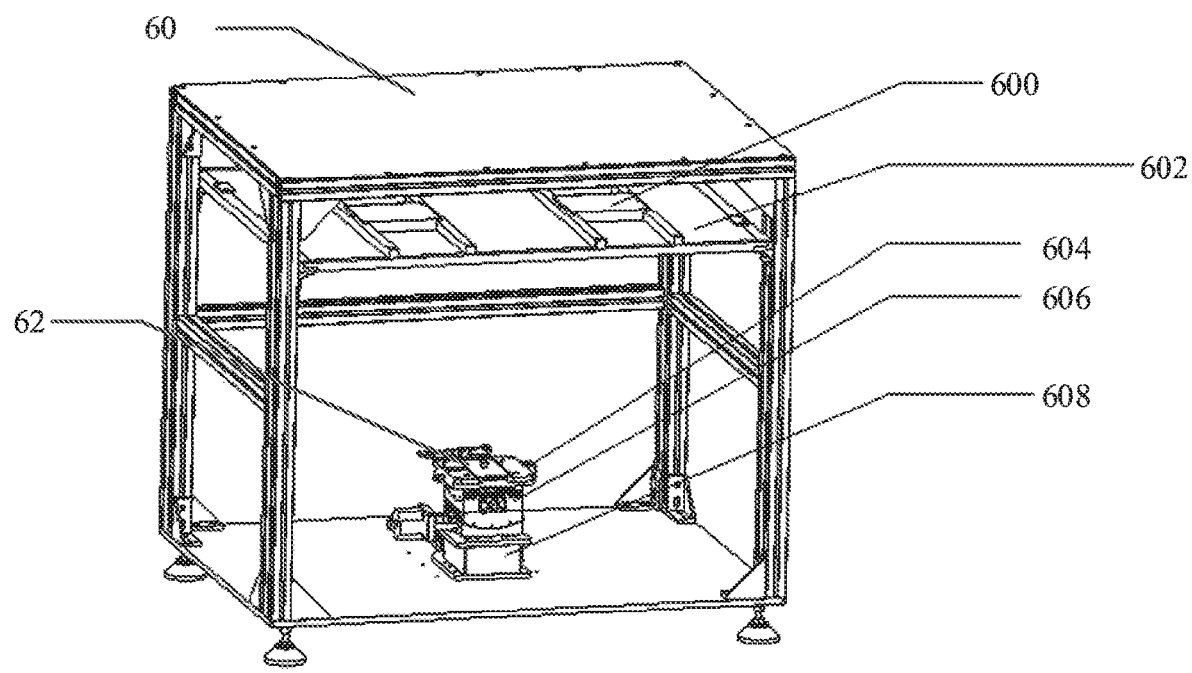
FIG. 6 illustrates a scenario diagram of an image processing method according to an embodiment of the present disclosure.

FIG. 6 illustrates a scenario diagram of an image processing method according to an embodiment of the present disclosure. As illustrated in FIG. 6, a scenario may include a calibration device 60 and an electronic device 62. A camera component may be mounted on the electronic device 62. The camera component may include a light emitter (such as a laser lamp) and a camera (such as a laser camera). The electronic device 62 is fixed to the calibration device 60. The camera component of the electronic device 62 may be calibrated by the calibration device 60. In detail, the calibration device 60 may include a surface light source 600, a reference plane 602, a laser sensor 604, an electric angle table 606, and an electric lifting platform 608. The electric angle table 606 may adjust an angle of the electronic device 62 such that an optical axis of the camera component of the electronic device 62 is perpendicular to the reference plane 602. The electric lifting platform 608 may adjust a vertical distance between the electronic device 62 and the reference plane 602. The vertical distance may be measured by the laser sensor 604. The surface light source 600 is configured to illuminate a coding area on the reference plane 602. The electronic device 62 may control temperature of the camera component to reach at least two different specified temperatures. When light sources emitted by the light emitter at different specified temperatures illuminate to the reference plane 602, reference images formed on the reference plane 602 at different specified temperatures are acquired by the camera. A correspondence between the specified temperatures and the reference images is established. The specified temperatures and the reference images are stored correspondingly.

Figure 7:
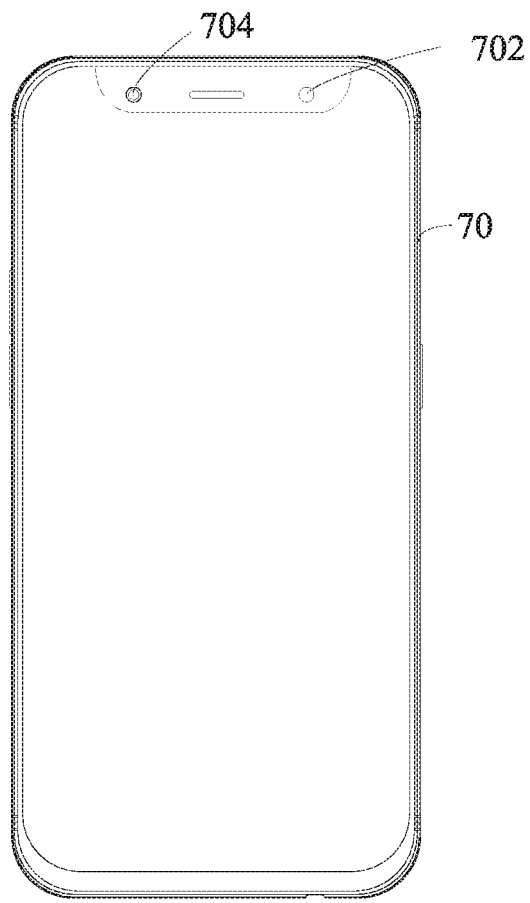
FIG. 7 illustrates a schematic diagram of an electronic device equipped with a camera component according to an embodiment of the present disclosure.

FIG. 7 illustrates a schematic diagram of an electronic device equipped with a camera component according to an embodiment of the present disclosure. As illustrated in FIG. 7, a camera component is mounted on the electronic device 70. The camera component may include a light emitter 702 and a camera 704. In a process of calibrating the camera, the electronic device 70 may control temperature of the camera component to reach different specified temperatures, and emit light through the light emitter 702 at different specified temperatures, and collect reference images formed when the light illuminates a reference plane. The electronic device 70 may establish a correspondence between specified temperatures and reference images, and store the specified temperatures and the reference images.

Figure 8:
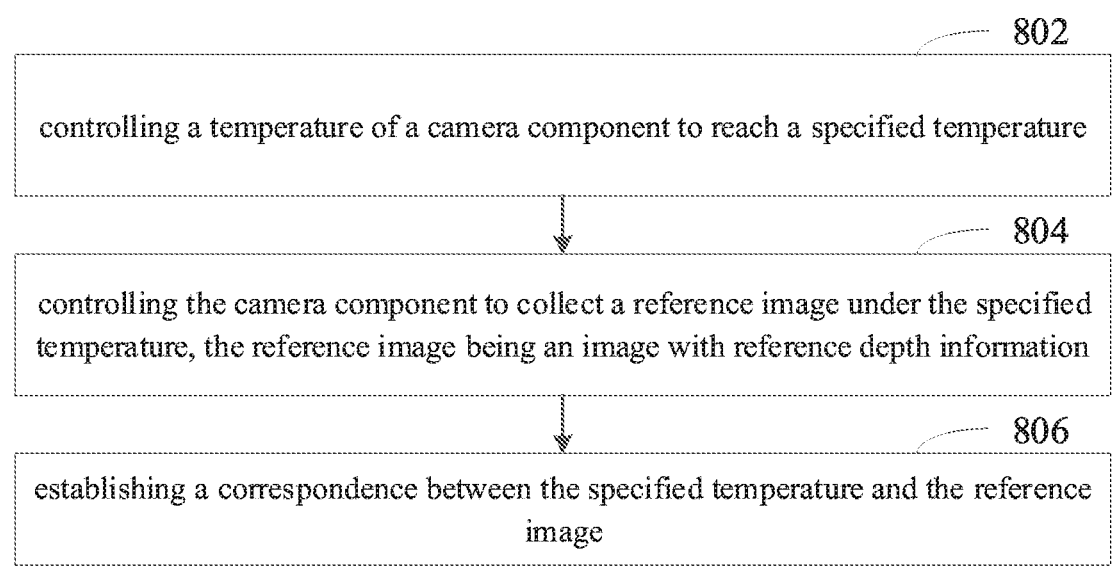
FIG. 8 illustrates a flowchart of an image processing method according to an embodiment of the present disclosure.

FIG. 8 illustrates a flowchart of an image processing method according to an embodiment of the present disclosure. As illustrated in FIG. 8, the image processing method may include acts in block 802 to block 806.

At block 802, a temperature of a camera component is controlled to reach a specified temperature.

At block 804, the camera component is controlled to collect a reference image under the specified temperature. The reference image is an image with reference depth information.

At block 806, a correspondence between the specified temperature and the reference image is established.

Figure 9:
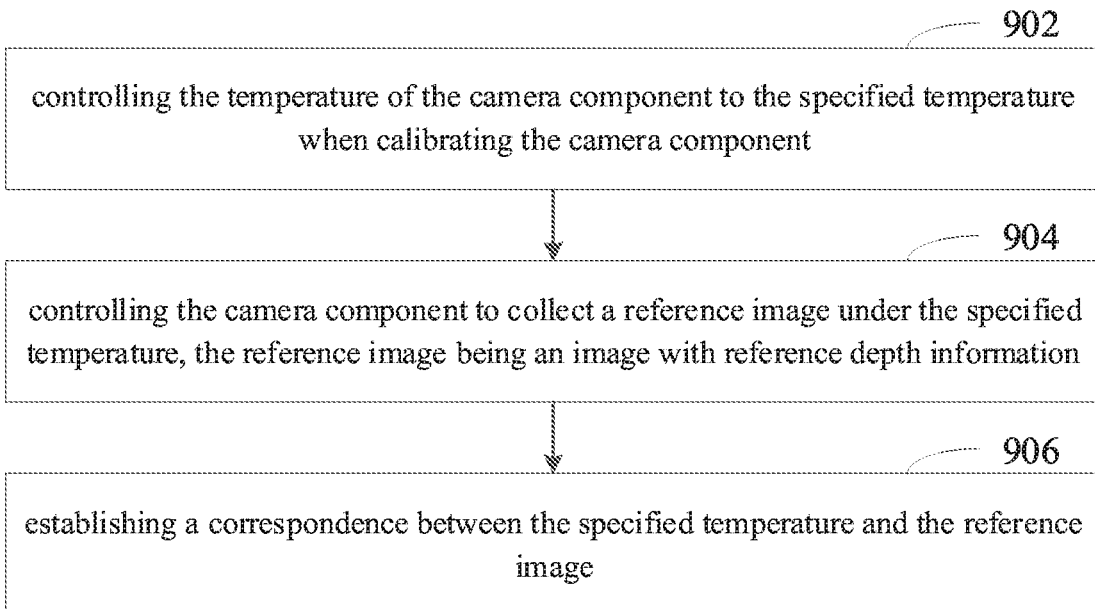
FIG. 9 illustrates a flowchart of an image processing method according to an embodiment of the present disclosure.

FIG. 9 illustrates a flowchart of an image processing method according to an embodiment of the present disclosure. As illustrated in FIG. 9, the image processing method may include acts in block 902 to block 906. The act in block 802 may include act in block 902.

At block 902, the temperature of the camera component is controlled to the specified temperature when calibrating the camera component.

In one embodiment, when calibrating the camera component, the camera is controlled to collect a reference image formed when the laser speckles illuminate onto an object with a fixed depth. The acquired reference image also includes several spots. Since the depth of the object is known, the depth of each spot in the reference image is also known. In a process of actually employing the camera component to collect the depth, the depth information corresponding to each spot in the speckle image may be calculated based on a deviation between the acquired speckle image and the depth image. In detail, the reference images acquired by the camera component may be different at different temperatures due to temperature. Therefore, in order to ensure more accurate depth information, it is necessary to control the camera component to collect reference images at different temperatures. In detail, the temperature of the camera component may be controlled to reach at least two specified temperatures.

When the reference image is acquired, the laser speckles are emitted by the laser lamp. The image formed when the laser speckles illuminate onto the object is collected by the laser camera. The operation of the laser lamp may be controlled by a pulse wave, so that the higher the operating frequency, the higher the temperature generated by the laser lamp, thereby increasing the temperature of the camera component. Therefore, during a calibration process, the temperature of the camera component may be adjusted by controlling the operating frequency of the laser lamp. In detail, the laser lamp may be controlled to operate at a specified frequency, and the temperature of the camera component is controlled to reach a specified temperature by the laser lamp operating at the specified frequency.

In the embodiment provided in the present disclosure, a first processing unit is coupled to the camera component. The operating frequency of the laser lamp may be controlled by the first processing unit. The first processing unit may input a pulse signal to the laser lamp to control the laser lamp to turn on and off by the pulse signal. In detail, a manner of controlling the laser lamp may include: outputting a pulse signal with the specified frequency by a first processing unit, and controlling the laser lamp to operate by the pulse signal with the specified frequency. For example, the first processing unit may control the turning on and off of the laser lamp by a PWM (Pulse-Width Modulation) signal so that the laser lamp operates at the specified frequency.

At block 904, the camera component is controlled to collect the reference image under the specified temperature. The reference image is an image with reference depth information.

At block 906, a correspondence between the specified temperature and the reference image is established.

Each time the reference image is acquired, the electronic device may associate the acquired reference image with the specified temperature. After acquiring the reference image, the electronic device may store the reference image with the corresponding specified temperature. In this way, in an actual capturing process, the corresponding reference image may be acquired based on the temperature of the camera component. To ensure the security of image processing, the electronic device may calculate depth images in a secure execution environment. Therefore, the acquired reference image and the corresponding specified temperature may be stored in the first processing unit in the secure execution environment. Therefore, after the camera component transmits the speckle image to the first processing unit, the first processing unit may directly calculate the depth image based on the speckle image and the reference image.

It should be understood that, since the camera component is unique, the acquired reference image is also unique. Therefore, in the calibration process, the collected reference images may be associated with the specified temperature and an identifier of the camera component, and stored together. In this way, even if the camera component in the electronic device is damaged and the camera component needs to be replaced, the acquired reference image may be ensured to be accurate. In detail, the identifier of the camera component is acquired, and a correspondence among specified temperatures, identifiers of the camera components, and reference images is established.

With the image processing method provided in the present disclosure, different reference images at different temperatures during the calibration of the camera component may be collected. When acquiring the speckle image, the reference image may be acquired based on the temperature of the camera component, and finally the depth image is acquired based on the speckle image and the reference image. In this way, the camera component may acquire different reference images at different temperatures. The depth images may be calculated based on the corresponding reference images at different temperatures, thereby reducing image errors caused by temperature changes and improving the accuracy of image processing.

Figure 10:
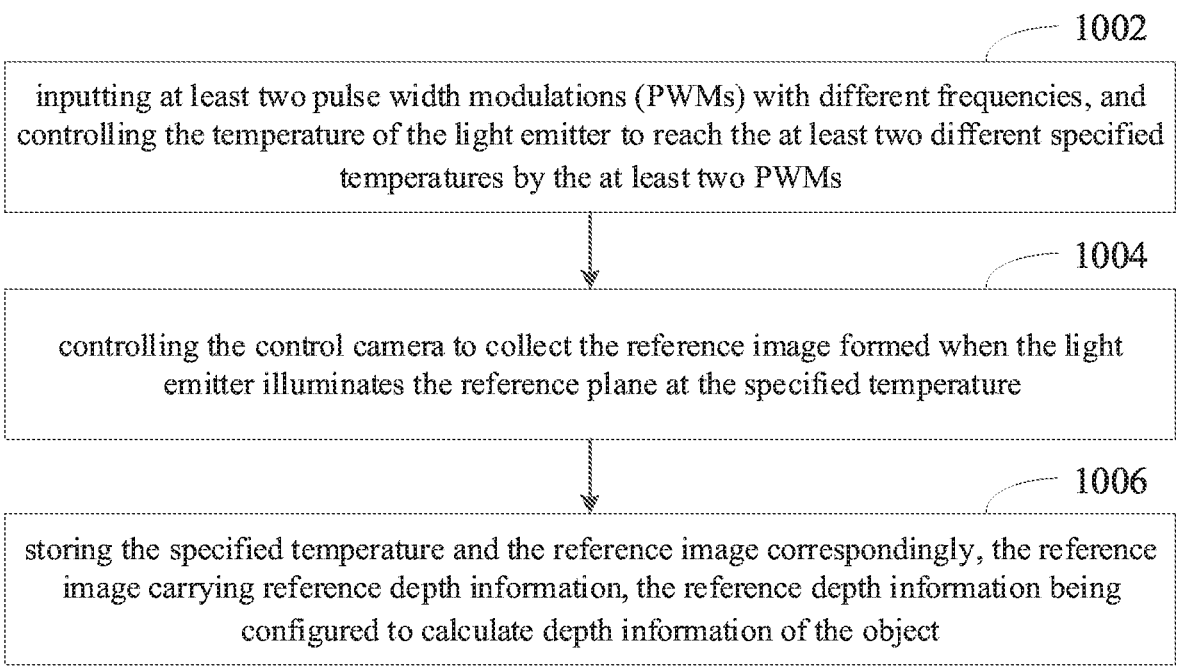
FIG. 10 illustrates a flowchart of an image processing method according to an embodiment of the present disclosure.

FIG. 10 illustrates a flowchart of an image processing method according to an embodiment of the present disclosure. As illustrated in FIG. 10, the image processing method may include acts in block 1002 to block 1006. The act in block 802 may include an act in block 1002.

At block 1002, at least two pulse width modulations (PWMs) with different frequencies are inputted, and the temperature of the light emitter is controlled to reach the at least two different specified temperatures by the at least two PWMs.

In one embodiment, a camera may be mounted on the electronic device. Images may be acquired by the mounted camera. The camera may be a laser camera, a visible-light camera, and the like, which is varied with different acquired images. The laser camera may acquire an image formed when laser light illuminates onto the object. The visible-light camera may acquire an image formed when visible light illuminates onto the object. The electronic device may be mounted with several cameras, and the corresponding mounted locations are not limited. For example, a camera may be mounted on a front panel of the electronic device, and two cameras may be mounted on a rear panel of the electronic device. The camera may also be mounted in an interior of the electronic device in an in-line manner, which may be turned on by rotating or sliding. In detail, a front camera and a rear camera may be mounded on the electronic device, and the front camera and the rear camera may acquire images from different angles of view. Generally, the front camera may acquire images from the front view of the electronic device, and the rear camera may acquire images from the rear view of the electronic device.

The electronic device may measure the depth information from the object in the scene to the electronic device through the captured images. In detail, the depth information may be measured by structured light. When acquiring the depth information through the structured light, the camera component including the light emitter and the camera may be mounted on the electronic device, and a process of acquiring the depth information may include a camera calibration phase and a measurement phase. In the camera calibration phase, the light emitter may emit light, the light illuminates the reference plane to form the reference image. The reference image is captured by the camera. A distance from the reference plane to the electronic device is known, and a correspondence between the known distance and the reference image may be established. In the measurement phase, an actual distance of the object may be calculated based on the image captured in real time and the corresponding described above.

It should be understood that, the camera component may generate heat during operation, and parameters and a shape of the camera component may be affected by temperature changes. Therefore, in order to reduce the error caused by the temperature, the camera component may be controlled to reach different temperatures during calibrating the camera. The camera component may be controlled to collect the reference images at different temperatures. In detail, the temperature of the camera component may be controlled to reach at least two different specified temperatures and fully calibrated at different specified temperatures.

The act in block 804 may include an act in block 1004.

At block 1004, the control camera is controlled to collect the reference image formed when the light emitter illuminates the reference plane at the specified temperature.

The light emitter and the camera in the camera component are generally on the same horizontal line. The calibration device first needs to adjust the position of the electronic device so that the optical axis formed by the light emitter and the camera is perpendicular to the reference plane. Therefore, a vertical distance from the electronic device to the reference plane may be calculated. It should be understood that, the above vertical distance may be adjusted, so that the reference images formed are different when the vertical distances from the electronic device to the reference plane are different. When the temperature of the camera component reaches a different specified temperature, the light source generator may be controlled to emit light. When the light illuminates the reference plane, the formed reference image is captured by the camera.

The act in block 806 may include an act in block 1006.

At block 1006, the specified temperature and the reference image are stored correspondingly. The reference image carries reference depth information. The reference depth information is configured to calculate depth information of the object.

The light emitter may emit a laser beam containing a plurality of laser speckles, and then the reference image formed when the above-mentioned laser beam containing the plurality of laser speckles illuminate on the reference plane, is collected by the camera. The reference depth information is the distance from the electronic device to the reference plane, and the reference depth information is known. A model for calculating the depth information may be acquired based on the reference image and the reference depth information. During the measurement process, the speckle image formed when the laser illuminates the object may be collected, and the depth information of the object contained in the speckle image may be calculated based on the model.

During the camera calibration process, reference images corresponding to different specified temperatures are collected and stored. In a process of measuring the depth information, the temperature of the camera component may be acquired first, and the corresponding reference image may be acquired based on the temperature. The depth information of the object is calculated based on the acquired reference image. For example, the camera component is controlled to collect a reference image at 30° C. (Degree Celsius) and a reference image at 80° C. The reference images corresponding to the camera component may be stored. In the measurement process, the current temperature of the camera component is first acquired, and the reference image corresponding to the specified temperature closest to the current temperature is acquired to calculate the depth information.

With the image processing method provided in the above embodiments, the temperature of the camera component may be controlled to reach at least two different specified temperatures, and to collect the reference images formed at different specified temperatures. The reference images and specified temperatures are stored correspondingly. Since the camera component will deform at different temperatures, and the temperature itself will affect the image captured by the camera component, the camera component is controlled to capture images at different specified temperatures when calibrating the camera. In this way, the corresponding reference image may be acquired based on the temperature of the camera component, and the depth information of the object may be calculated based on the reference depth information in the reference image, thereby avoiding the error caused by the change of temperature of the camera component, and improving the accuracy of image processing.

FIG. 11 illustrates a flowchart of an image processing method according to an embodiment of the present disclosure. As illustrated in FIG. 11, the image processing method may include acts in block 1102 to block 1112.

At block 1102, at least two pulse width modulations (PWMs) with different frequencies are inputted to the light emitter, and the temperature of the light emitter is controlled to reach the at least two different specified temperatures by the at least two PWMs.

In one embodiment, the light emitter may be coupled to the processor. The processor may transmit an instruction to the light emitter to turn on and off the light emitter. In detail, in the process of calibrating the camera, laser speckles may be emitted by the light emitter, and then the reference image formed when the laser speckles illuminate the object, is captured by the laser camera. The operation of the light emitter may be controlled by a pulse wave, so that the higher the operating frequency, the higher the temperature of the light emitter, and the temperature of the camera component will also increase. Therefore, during the calibration process, the temperature of the camera component may be adjusted by controlling the operating frequency of the light emitter. In detail, the light emitter may be controlled to operate at the specified frequency, and the temperature of the camera component is controlled to reach the specified temperature by the light emitter operating at the specified frequency.

In detail, the processor and the camera component may be coupled. The operating frequency of the light emitter is controlled by the processor. The processor may input a pulse signal to the light emitter and controls the light emitter to turn on and off through the pulse signal. The pulse signal may be PWM (Pulse Width Modulation), and the processor may input PWM of different frequencies to the light emitter, so that the light emitter reaches different specified temperatures.

At block 1104, the camera is controlled to collect the reference image formed when the light emitter illuminates a reference plane at a specified temperature.

Each time the reference image is acquired, the electronic device may associate the acquired reference image with the specified temperature. After acquiring the reference image, the electronic device stores the reference image with the corresponding specified temperature. In this way, in the actual capturing process, the corresponding reference image may be acquired based on the temperature of the camera component.

At block 1106, a correspondence between the specified temperature and the reference image is established, and the specified temperature and the reference image are written in a secure execution environment of a terminal for storage.

It should be understood that the correspondence between the specified temperature and the reference image may be directly established, or a temperature range may be delineated based on the specified temperature, and a correspondence between the temperature range and the reference image is established, and then the temperature range and the reference image are written to the terminal. For example, the reference images formed when the light emitter is at specified temperatures of 30° C., 60° C., and 90° C. may be captured, which are denoted as "pic-01", "pic-02", and "pic-03". If the temperature ranges corresponding to the above specified temperatures are [0, 50° C.], [50° C., 90° C.], [90° C., +∞). During the ranging process, it is possible to determine the temperature range in which the light emitter falls, and acquire a corresponding reference image based on the temperature range.

Typically, in order to ensure the security of image processing, the electronic device may calculate depth information in the secure execution environment. Therefore, the collected reference image and the corresponding specified temperature may be stored in the secure execution environment. During the measurement process, the depth information may be directly calculated in the secure execution environment. For example, an upper-layer application of the electronic device initiates a face payment instruction. In a process of face payment, the depth information may be acquired through the camera component, and the depth information is configured to determine whether the face is living. It is necessary to ensure that the depth information is calculated in the secure execution environment.

In the embodiment provided in the present disclosure, the secure execution environment in the terminal may be divided into a first secure execution environment and a second secure execution environment. A storage space in the first secure execution environment is greater than a storage space in the second secure execution environment. In order to prevent the storage space in the second secure execution environment from being over-occupied and affecting the processing of the image, the specified temperature and the reference image may be written into the first secure execution environment of the terminal for storage during the calibration process. When the terminal is detected to power on, the specified temperature and reference image are loaded from the first secure execution environment into the second secure execution environment for storage.

At block 1108, the camera component is controlled to collect a speckle image in response to detecting that the camera component is turned on.

In detail, a processing unit of the terminal may receive instructions from upper-layer applications. When the processing unit receives the image acquisition instruction, the camera component may be controlled to operate, and the speckle image may be collected by the camera. The processing unit is coupled to the camera. The image collected by the camera may be transmitted to the processing unit, and processed by the processing unit such as cropping, brightness adjustment, face detection, face recognition, and the like. In detail, when the processing unit receives the image acquisition instruction, the processing unit controls the light emitter to operate. When the light emitter is turned on, the speckle image formed when the light emitter illuminates on the object, may be collected by the laser camera.

It is to be understood that the above light emitter may be a laser emitter. When the laser light illuminates an optically-rough surface whose average fluctuation is greater than an order of magnitude of wavelength, sub-waves scattered by surface elements randomly-distributed on the surface may superimpose with each other, to cause a reflected light field to have a random spatial light intensity distribution showing Granular structure. That is the laser speckles. The laser speckles formed are highly random. Therefore, the laser speckles formed by the laser light emitted from different laser emitters are different. When the laser speckles formed illuminate onto objects of different depths and shapes, the generated speckle images are different. The laser speckles formed by the laser emitter is unique, so that the acquired speckle image is also unique. The laser speckles formed by the laser lamp may illuminate onto the object, and then the speckle image formed when the laser speckles illuminate onto the object may be collected by the laser camera.

The image acquisition instruction refers to an instruction for triggering an image acquisition operation. For example, when the user unlocks the smart phone, unlocking verification may be performed by acquiring a face image, and the upper-layer application may initiate the image acquisition instruction and control the camera component to collect images based on the image acquisition instruction. In detail, a first processing unit may receive the image acquisition instruction initiated by the upper-layer application. When the first processing unit detects the image acquisition instruction, the camera component may be controlled to be turned on, and to collect the speckle image. The speckle image collected by the camera component may be transmitted to the first processing unit, and the first processing unit processes the speckle image.

At block 1110, a current temperature of the light emitter is acquired when it is detected that a change of temperature of the light emitter exceeds a temperature threshold.

After detecting that the camera component is turned on, the temperature of the light emitter may be periodically detected by a temperature sensor, and the detected temperature is transmitted to the first processing unit. The first processing unit determines whether the change of temperature of the light emitter exceeds the temperature threshold. If yes, the first processing unit employs the temperature as the current temperature of the light emitter, and acquires a corresponding target reference image based on the current temperature, and calculates the depth information based on the acquired target reference image. For example, the temperature threshold may be 5° C. When the temperature of the light emitter changes by more than 5° C., the corresponding target reference image may be determined based on the acquired temperature of the light emitter. It should be understood that, in order to ensure accuracy, a period of time between collecting the speckle image and acquiring the current temperature should not be too long.

At block 1112, a corresponding target reference image is acquired based on the current temperature of the light emitter, and a depth image is calculated based on the speckle image and the target reference image. The depth image is configured to represent depth information of the object.

The specified temperature and the reference image are stored correspondingly. In a process of measuring the depth information, the corresponding target reference image may be determined based on the current temperature of the light emitter, and then the depth image is calculated based on the speckle image and the target reference image. In detail, the target reference image may be compared with the speckle image to acquire offset information. The offset information is configured to represent a horizontal offset of a speckle in the speckle image relative to a corresponding speckle in the reference image. The depth image is calculated based on the offset information with the reference depth information.

In one embodiment, each pixel point (x, y) in the speckle image is traversed as follows. A pixel block of predetermined size is selected centering on the pixel point. For example, it is possible to select a pixel block of 31 pixels*31 pixels. Then a matched pixel block may be searched in the target reference image. A horizontal offset of coordinates of the matched pixel point in the target reference image and coordinates of the pixel point (x, y), in which shifting to right is denoted as positive, shifting to left is denoted as negative, may be calculated. The calculated horizontal offset is brought into formula (1) to acquire depth information of the pixel point (x, y). By sequentially calculating depth information of each pixel in the speckle image, the depth information corresponding to each pixel in the speckle image may be acquired.

The depth image may be configured to represent depth information corresponding to the photographed object. Each pixel included in the depth image represents one depth information. In detail, each of spots in the reference image corresponds to one reference depth information. After acquiring the horizontal offset of the spots in the reference image and the spots in the speckle image, the relative depth information of the object in the speckle image to the reference plane may be calculated based on the horizontal offset. The actual depth information of the object to the camera may be calculated based on the relative depth information and the reference depth information. That is, the final depth image is acquired.

As illustrated in FIG. 4 again, the laser lamp 402 may generate laser speckles.

The laser speckles are reflected by the object and are captured by the laser camera 404 to acquire the image. During calibrating the camera, the laser speckles emitted by the laser lamp 402 are reflected by the reference plane 408. The reflected light is collected by the laser camera 404. The imaging plane 410 is imaged to acquire the reference image. The reference plane 408 to the laser lamp 402 has a reference depth of L, which is known. In a process of actually calculating the depth information, the laser speckles emitted by the laser lamp 402 are reflected by the object 406, and the reflected light is collected by the laser camera 404. The imaging plane 410 may be imaged to acquire the actual speckle image. Then the actual depth information may be calculated by a formula of:

$$Dis = \frac{CD \times L \times f}{L \times AB \times CD \times f}. \quad (1)$$

wherein L represents a distance between the laser lamp 402 and the reference plane 408, f represents a focal length of a lens in the laser camera 404, CD represents a distance between the laser lamp 402 and the laser camera 404, and AB represents an offset distance between the imaging of the object 406 and the imaging of the reference plane 408. AB may be a product of the pixel offset n and an actual distance p of the pixel. When the distance D is between the object 406 and the laser lamp 402 is greater than the distance L between the reference plane 408 and the laser lamp 402, AB is a negative value. When the distance D is between the object 406 and the laser lamp 402 is less than the distance L between the reference plane 408 and the laser lamp 402, AB is a positive value.

In one embodiment, the camera component may include a first camera component and a second camera component. The first camera component may include a floodlight and a laser camera. The second camera component may include a laser lamp and a laser camera. The laser camera of the first camera component and the laser camera of the second camera component may be the same laser camera or different laser cameras, which are not limited herein. The laser lamp may emit laser speckles, and the speckle image may be captured by the first camera component. The floodlight may generate visible light, and the infrared image may be captured by the second camera component.

The infrared image may represent detailed information of the object to be photographed. The depth information of the object to be photographed may be acquired based on the speckle image. In order to ensure that the infrared image and speckle image collected by the electronic device correspond, it is necessary to control the camera component to simultaneously acquire the infrared image and the speckle image. Assuming that the first camera component and the second camera component operate in a time-sharing manner, it is necessary to ensure that a time interval between the acquisition of the infrared image and the acquisition of the speckle image is very short. In detail, based on the image acquisition instruction, the first camera component is controlled to collect the infrared image, and the second camera component is controlled collect the speckle image. A time interval between a first moment of acquiring the infrared image and a second moment of acquiring the speckle image is less than a first threshold.

The first threshold is generally a relatively small value. When the time interval is less than the first threshold, it is considered that the object has not changed, and the acquired infrared image and speckle image are corresponding. It should be understood that, the adjustment may also be made based on a changing rule of the object to be photographed. The faster the object changes, the smaller the first threshold corresponding to the acquisition. The first threshold may be set to a larger value assuming that the object is in a stationary state for a long period of time. In detail, a speed of change of the object is acquired, and the corresponding first threshold is acquired based on the speed of change.

For example, when the mobile phone needs to be authenticated and unlocked by the face, the user may click an unlocking button to initiate an unlocking instruction, and point a front camera to the face for capturing. The mobile phone transmits the unlocking instruction to the processing unit. The processing unit in turn controls the camera to operate. Firstly, the infrared image is collected by the first camera component, and after the interval of 1 millisecond, the second camera component is controlled to collect the speckle image. The acquired infrared image and speckle image are employed for authentication and unlocking.

Further, the camera component is controlled to collect the infrared image at the first time, and the camera component is controlled to collect the speckle image at the second time. The time interval between the first time and the target time is less than a second threshold. The time interval between the second time and the target time is less than a third threshold. If the time interval between the first time and the target time is less than the second threshold, the camera component is controlled to collect the infrared image. If the time interval between the first time and the target time is greater than the second threshold, a prompt message of response timeout may be returned to the application, and it waits for the application to re-initiate the image acquisition instruction.

After the camera component collects the infrared image, the processing unit may control the camera component to collect the speckle image. The time interval between the second moment of collecting the speckle image and the first moment is less than the first threshold, and the time interval between the second moment and the target moment is less than the third threshold. If the time interval between the second moment and the first moment is greater than the first threshold, or the time interval between the second moment and the target moment is greater than the third threshold, a prompt message of response timeout may be returned to the application, and it waits for the application to re-initiate the image acquisition instruction. It should be understood that the second moment of acquiring the speckle image may be greater than the first moment of acquiring the infrared image, or may be smaller than the first moment of acquiring the infrared image, which is not limited herein.

In detail, the electronic device may be equipped with a floodlight controller and a laser lamp controller, and may be coupled to the floodlight controller and the laser lamp controller through two PWM (Pulse Width Modulation) paths. The processing unit may input the PWM to the floodlight controller to control the floodlight to turn on and off, or input the PWM to the laser lamp controller to control the laser lamp to turn on and off.

Figure 12:
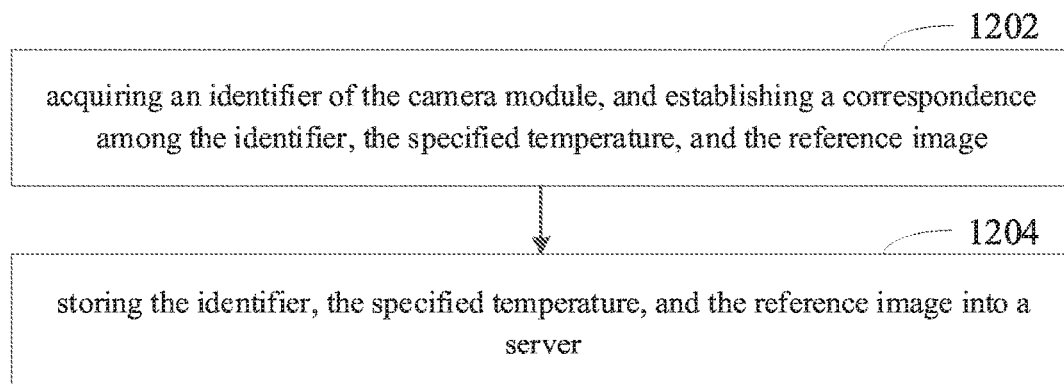
FIG. 12 illustrates a flowchart of an image processing method according to an embodiment of the present disclosure.

As illustrated in FIG. 12, in the embodiment provided in the present disclosure, the act of storing the reference image may further include acts in the following blocks.

At block 1202, an identifier of the camera component is acquired, and a correspondence among the identifier, the specified temperature, and the reference image.

It should be understood that, in a process of calibrating the camera, the camera component mounted on the terminal may be calibrated, or the camera component may be calibrated separately. In this way, it is assumed that the camera component on the terminal is damaged. After replacing the camera component, the reference image of the camera component acquired by calibration may be directly written into the terminal.

In detail, each camera component has a corresponding identifier. The identifiers of the camera components may be configured to distinguish different camera components. When the camera component is calibrated, after the reference image is acquired, the correspondence among the identifier of the camera component, the specified temperature, and the reference image may be established. In this way, after the camera component is remounted on the terminal, the corresponding specified temperature and reference image may be acquired based on the identifier of the camera component.

At block 1204, the identifier, the specified temperature, and the reference image are stored in a server.

Figure 13:
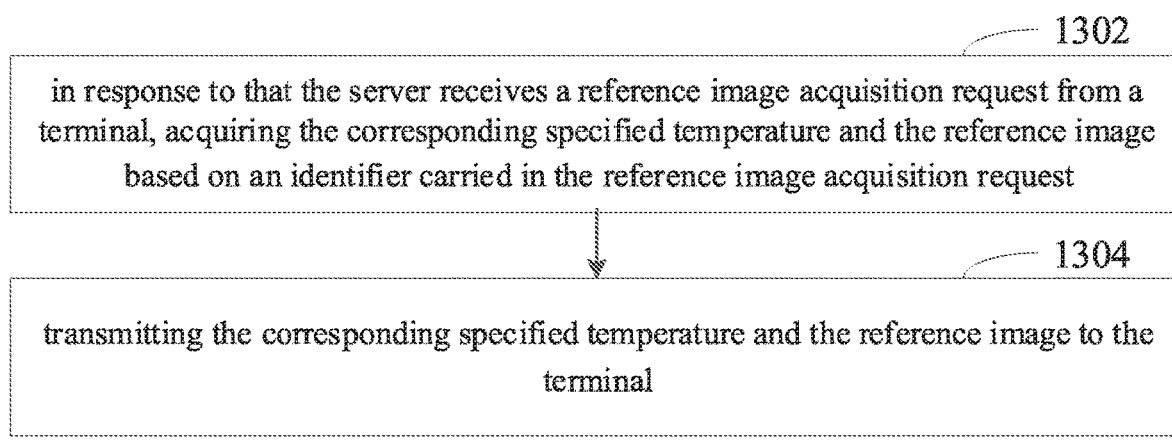
FIG. 13 illustrates a flowchart of an image processing method according to an embodiment of the present disclosure.

In a process of separately calibrating the camera component, the acquired identifier of the camera component, specified temperature, and reference image may be stored in the server. The server may store the above identifier of the camera component, specified temperature, and reference image in a form of lists. The specified temperature and the reference image may be queried and acquired based on the identifier of the camera component. After the camera component is calibrated, the terminal may acquire the reference image from the server when remounting the camera component. In detail, it is illustrated in FIG. 13.

At block 1302, in response to that the server receives a reference image acquisition request from the terminal, the server acquires the corresponding specified temperature and the reference image based on ab identifier carried in the request.

The terminal may remount the camera component. After remounting the camera component, the identifier of the camera component may be read. The request for acquiring the reference image may be generated based on the identifier of the camera component. The request for acquiring the reference image may be transmitted to the server. In detail, when transmitting the request for acquiring the reference image, the terminal may encrypt the identifier of the camera component, and transmit the encrypted request for acquiring the reference image to the server.

At block 1304, the specified temperature and the reference image are transmitted to the terminal.

After receiving the request for acquiring the reference image, the server may search for the corresponding specified temperature and the reference image based on the identifier of the camera component, and encrypt the specified temperature and the reference image and then transmit them to the terminal. After receiving the specified temperature and the reference image, the terminal may decrypt the specified temperature and the reference image and the specified temperature and reference image after the decryption process are then written to the terminal. In detail, algorithms for encrypting the identifier of the camera component, the specified temperature, and the reference image is not limited. For example, it may be based on DES (Data Encryption Standard), MD5 (Message-Digest Algorithm 5), and HAVAL (Diffie-Hellman).

With the image processing method provided in the above embodiments, the temperature of the camera component may be controlled to reach at least two different specified temperatures. The camera component may be controlled collect the reference images formed at different specified temperatures. The reference images and the specified temperatures may be stored correspondingly. Since the camera component will deform at different temperatures, and the temperature itself will affect the image captured by the camera component, the camera component is controlled to capture images at different specified temperatures when calibrating the camera. In this way, the corresponding reference image may be acquired based on the temperature of the camera component, and the depth information of the object may be calculated based on the reference depth information in the reference image, thereby avoiding the error caused by the change of temperature of the camera component, and improving the accuracy of image processing.

It should be understood that although the acts in the flowcharts of FIG. 2, FIG. 3, FIG. 5, and FIG. 8 to FIG. 13 are sequentially displayed in accordance with the indication of the arrows, these acts are not necessarily performed in the order indicated by the arrows. Except as explicitly stated herein, the execution of these acts is not strictly limited, and the acts may be performed in other orders. Moreover, at least some of the acts in FIG. 2, FIG. 3, FIG. 5, and FIG. 8 to FIG. 13 may include a plurality of sub-acts or stages, which are not necessarily performed at the same time, but may be executed at different times. The order of execution of these sub-acts or stages is not necessarily performed sequentially, but may be performed alternately or alternately with at least one portion of the sub-acts or stages of the other acts or other acts.

Figure 14:
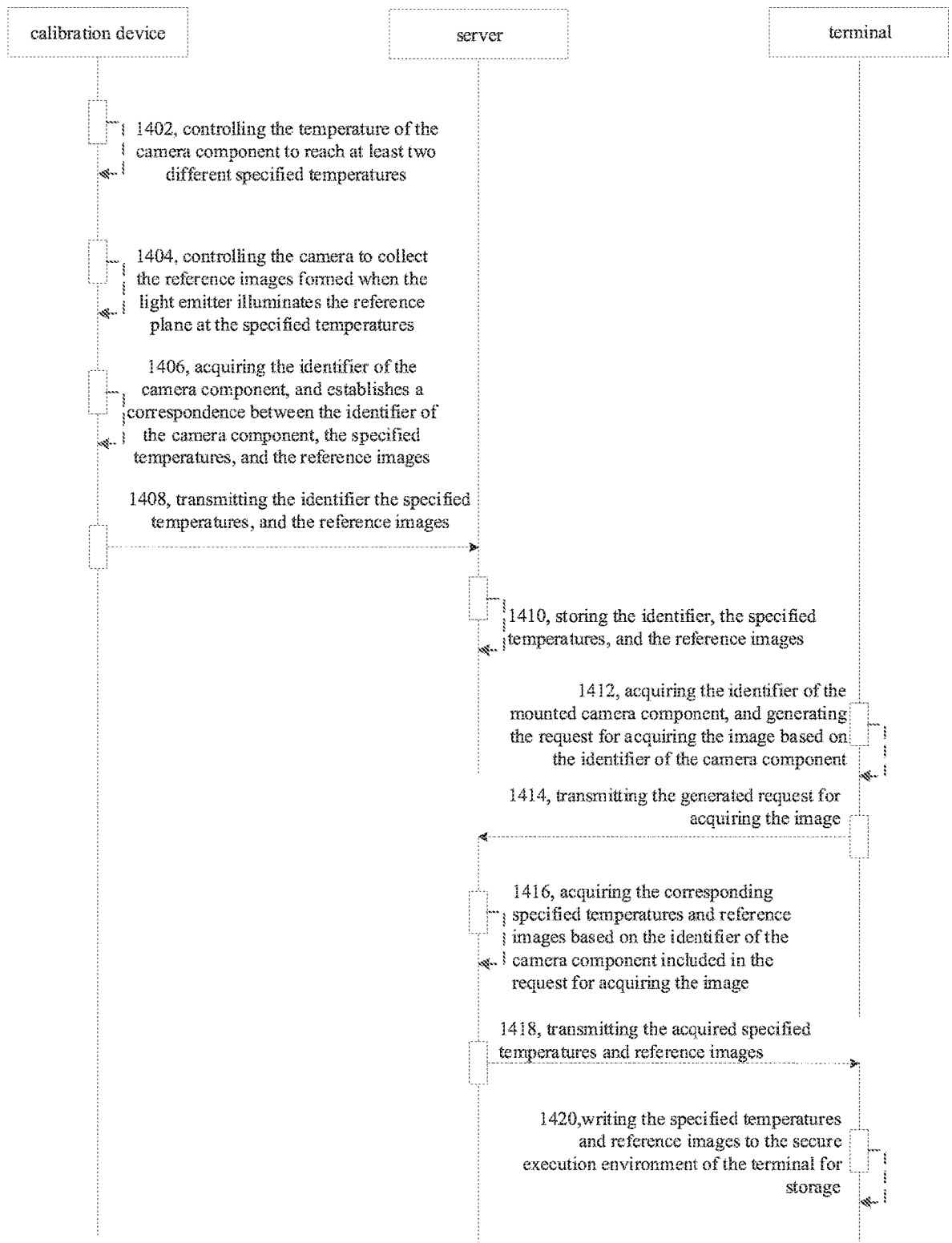
FIG. 14 illustrates an interaction diagram of realizing an image processing method according to an embodiment of the present disclosure.

FIG. 14 illustrates an interaction diagram of realizing an image processing method according to an embodiment of the present disclosure. The interaction process of the image processing method may include acts in blocks 1402 to blocks 1420.

At block 1402, the calibration device controls the temperature of the camera component to reach at least two different specified temperatures.

At block 1404, the calibration device controls the camera to collect the reference images formed when the light emitter illuminates the reference plane at the specified temperatures.

At block 1406, the calibration device acquires the identifier of the camera component, and establishes a correspondence between the identifier of the camera component, the specified temperatures, and the reference images.

At block 1408, the calibration device transmits the identifier of the camera component, the specified temperatures, and the reference images to the server.

At block 1410, the server receives and stores the identifier of the camera component, the specified temperatures, and the reference images.

At block 1412, the terminal mounts the camera component, and acquires the identifier of the mounted camera component, and generates the request for acquiring the image based on the identifier of the camera component.

At block 1414, the terminal transmits the generated request for acquiring the image to the server.

At block 1416, the server acquires the corresponding specified temperatures and reference images based on the identifier of the camera component included in the request for acquiring the image.

At block 1418, the server transmits the acquired specified temperatures and reference images to the terminal.

At block 1420, the terminal receives the specified temperatures and reference images from the server and writes the specified temperatures and reference images to the secure execution environment of the terminal for storage.

With the image processing method provided in the above embodiments, the corresponding reference image may be acquired based on the temperature of the camera component, and the depth information of the object is calculated based on the reference depth information in the reference image, thereby avoiding the error caused by the change of temperature of the camera component, and improving the accuracy of image processing.

Figure 15:
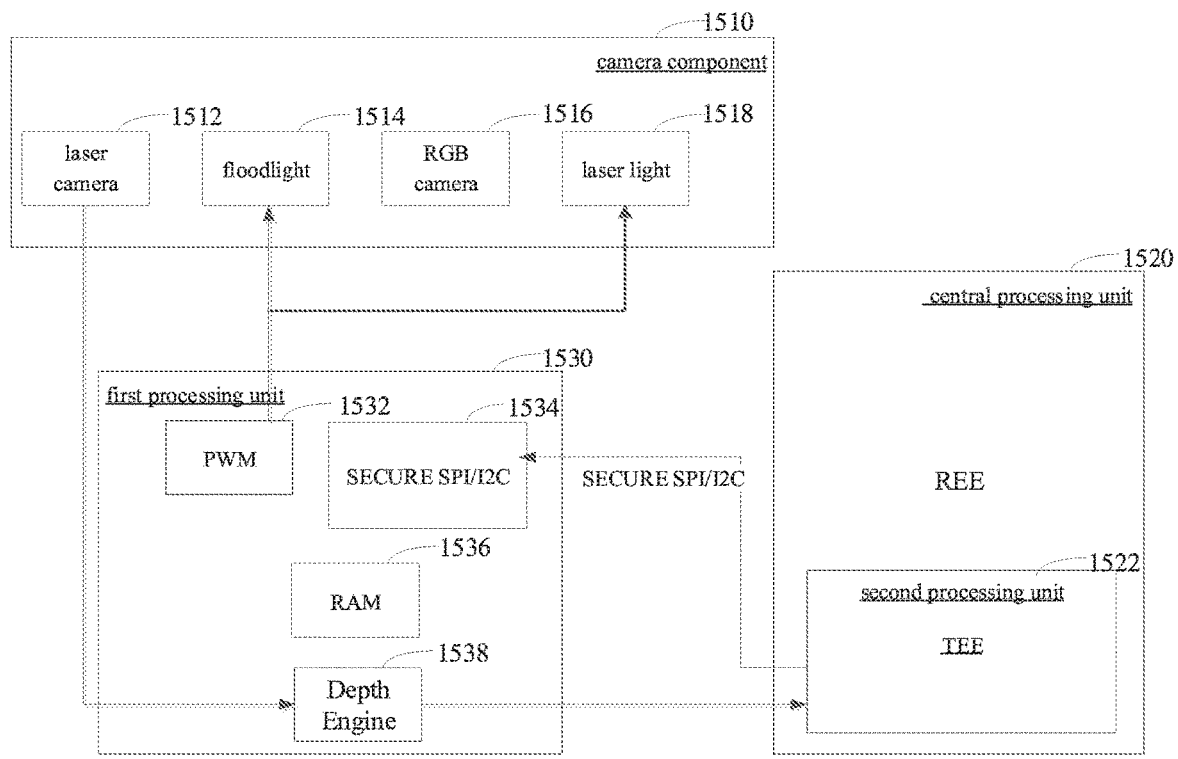
FIG. 15 illustrates a hardware structure diagram of realizing an image processing method according to an embodiment of the present disclosure.

FIG. 15 illustrates a hardware structure diagram of realizing an image processing method according to an embodiment of the present disclosure.

As illustrated in FIG. 15, the electronic device may include a camera component 1510, a central processing unit (CPU) 1520, and a first processing unit 1530. The camera component 1510 includes a laser camera 1512, a floodlight 1514, an RGB (Red/Green/Blue color mode) camera 1516, and a laser light 1518. The first processing unit 1530 may include a PWM (Pulse Width Modulation) module 1532, a SPI/I2C (Serial Peripheral Interface/Inter-Integrated Circuit) module 1534, a RAM (Random Access Memory) module 1536, and a depth engine module 1538. The second processing unit 1522 may be a CPU core under a TEE (Trusted execution environment). The first processing unit 1530 may be an MCU (Microcontroller Unit) processor. It should be understood that the central processing unit 1520 may be in a multi-core operation mode. The CPU core in the central processing unit 1520 may be operated under a TEE or REE (Rich Execution Environment). Both TEE and REE are operating modes of ARM modules (Advanced RISC Machines). Normally, the high-security operation behavior of the electronic device needs to be performed under the TEE, and other operation behaviors should be performed under the REE. In the embodiments of the present disclosure, when the central processing unit 1520 receives the image acquisition instruction initiated by the target application, the CPU core running under the TEE, that is, the second processing unit 1522, transmits the image acquisition instruction to the SPI/I2C module 1534 in the MCU 1530 through SECURE SPI/I2C, such that the image acquisition instruction is transmitted to the first processing unit 1530. After receiving the image acquisition instruction, the first processing unit 1530 transmits the pulse wave through the PWM module 1532 to control the floodlight 1514 in the camera component 1510 to turn on to collect the infrared image, and control the laser lamp 1518 in the camera component 1510 to turn on the collect the speckle image. The camera component 1510 may transmit the collected infrared image and speckle image to the depth engine module 1538 in the first processing unit 1530. The depth engine module 1538 may calculate the infrared parallax image based on the infrared image, and calculate the depth image based on the speckle image and the reference image, and acquire the depth parallax image based on the depth image. The infrared parallax image and the depth parallax image are then transmitted to the second processing unit 1522 running under the TEE. The second processing unit 1522 performs correction based on the infrared parallax image to acquire a corrected infrared image, and performs correction based on the depth parallax image to acquire a corrected depth image. The face recognition may be performed based on the corrected infrared image to detect whether there is a face in the corrected infrared image and whether the detected face matches the stored face. If the face recognition passes, based on the corrected infrared image and corrected depth image, the liveness detection is performed to detect whether the face is a living face. In one embodiment, after the corrected infrared image and the corrected depth image are acquired, the liveness detection may be performed first, then the face recognition may be performed, or the face recognition and the liveness detection may be performed simultaneously. After the face recognition passes and the detected face is a living face, the second processing unit 1522 may transmit one or more of: the corrected infrared image, the corrected depth image, and a result of face recognition to the target application.

During calibrating the camera, the laser lamp 1518 may be controlled by the PWM module 1532 in the first processing unit 1530 to reach at least two different specified temperatures. When the different specified temperatures are reached, the laser camera 1512 is controlled to collect the reference images formed when the laser lamp 1518 illuminates the reference plane. The acquired reference images and the specified temperatures may be stored in the second processing unit 1522 in a trusted execution environment (first secure execution environment). When the electronic device is turned on, the specified temperatures and the reference images are loaded from the second processing unit 1522 to the first processing unit 1530 for storage. It should be understood that the first processing unit 1530 is a processing unit external to the central processing unit 1520, and its input and output are both controlled by the second processing unit 1522 in the trusted execution environment, and thus may be considered as the first processing unit 1530 is in a second secure execution environment.

In a process of measuring the depth information, when the central processing unit 1520 receives the image acquisition instruction initiated by the target application, the CPU core running under the TEE, that is, the second processing unit 1522, transmits the image acquisition instruction to the SPI/I2C module 1534 in the MCU 1530 through the SECURE SPI/I2C to the first processing unit 1530. After receiving the image acquisition instruction, the first processing unit 1530 transmits the pulse wave through the PWM module 1532 to turn on the floodlight 1514 in the camera component, to collect the infrared image, and turn on the laser module 1518 in the camera component 1510, to collect the speckle image. The camera component 1510 may transmit the collected infrared image and speckle image to the depth engine module 1538 in the first processing unit 1530. The depth engine module 1538 may calculate the infrared parallax image based on the infrared image, and calculate the depth image based on the speckle image and the reference image, and acquire the depth parallax image based on the depth image. The infrared parallax image and the depth parallax image are then transmitted to the second processing unit 1522 running under the TEE. The second processing unit 1522 performs correction based on the infrared parallax image to acquire a corrected infrared image, and performs correction based on the depth parallax image to acquire a corrected depth image. Since the laser camera 1512 and the RGB camera 1516 are mounted at different positions, it is necessary to perform alignment correction on the images acquired by the two cameras when capturing images to avoid errors caused by the capturing angles. That is, the infrared image and the depth image need to be corrected to acquire a corrected infrared image and a corrected depth image.

In an embodiment, the face recognition may be performed based on the corrected infrared image. It is detected whether there is a face in the corrected infrared image, and whether the detected face matches the stored face. If the face recognition passes, a liveliness detection may be performed based on the corrected infrared image and the corrected depth image to detect whether the face is a living face. After acquiring the corrected infrared image and the corrected depth image, the liveliness detection may be performed first, then the face recognition may be performed, or the face recognition and the liveliness detection may be performed synchronously. After the face recognition passes and the detected face is a living face, the second processing unit 1522 may transmit one or more of: the corrected infrared image, the corrected depth image, and a result of face recognition, to the target application.

Figure 16:
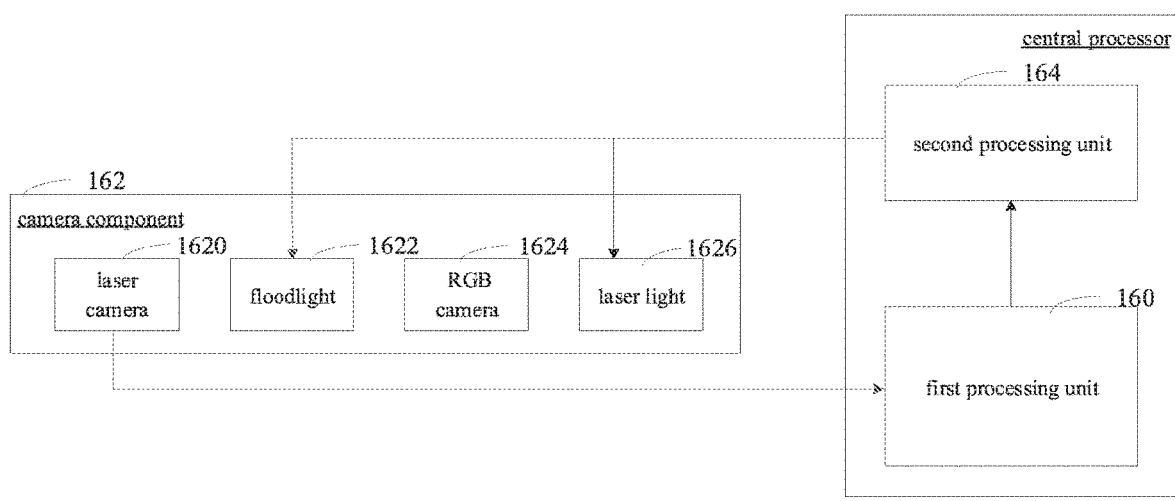
FIG. 16 illustrates a hardware structure diagram of realizing an image processing method according to an embodiment of the present disclosure.

FIG. 16 illustrates a hardware structure diagram of realizing an image processing method according to an embodiment of the present disclosure. As illustrated in FIG. 16, the hardware structure includes a first processing unit 160, a camera component 162, and a second processing unit 164. The camera component 162 includes a laser camera 1620, a floodlight 1622, an RGB camera 1624, and a laser light 1626. The central processor may include a CPU core under the TEE and a CPU core under the REE. The first processing unit 160 is a DSP processing module opened in the central processing unit, and the second processing unit 164 is the CPU under the TEE. The second processing unit 164 and the first processing unit 160 may be coupled through a secure buffer, to ensure security during image transmission. Normally, when the central processor hands a high-security operation behavior, it needs to switch the core of the processor to the TEE, and the low-security operation behavior may be performed under the REE. In the embodiment of the present disclosure, the image acquisition instruction transmitted by the upper-layer application is received by the second processing unit 164, and the PWM module is controlled to transmit the pulse wave to control the floodlight 1622 in the camera component 162 to turn on, to collect the infrared image, and to control the laser light 1626 in the camera component 162 to turn on, to collect the speckle image. The camera component 162 may transmit the collected infrared image and the collected speckle image to the first processing unit 160. The first processing unit 160 may store the reference image, and calculate the depth image based on the speckle image and the reference image, and calculate the depth parallax image based on the depth image and calculate the infrared parallax image based on the infrared image. The infrared parallax image and the depth parallax image are transmitted to the second processing unit 164. The second processing unit 164 may perform correction based on the infrared parallax image to acquire a corrected infrared image, and perform correction based on the depth parallax image to acquire a corrected depth image. The second processing unit 164 performs face authentication based on the infrared image, detects whether there is a human face in the corrected infrared image, and whether the detected face matches the stored face. If the face authentication passes, the liveliness detection is performed based on the corrected infrared image and the corrected depth image to determine whether the face is a living face. After the second processing unit 164 performs the face authentication and the liveliness detection, the processing result is transmitted to the target application, and the target application performs an application operation such as unlocking and payment based on the processing result.

Figure 17:
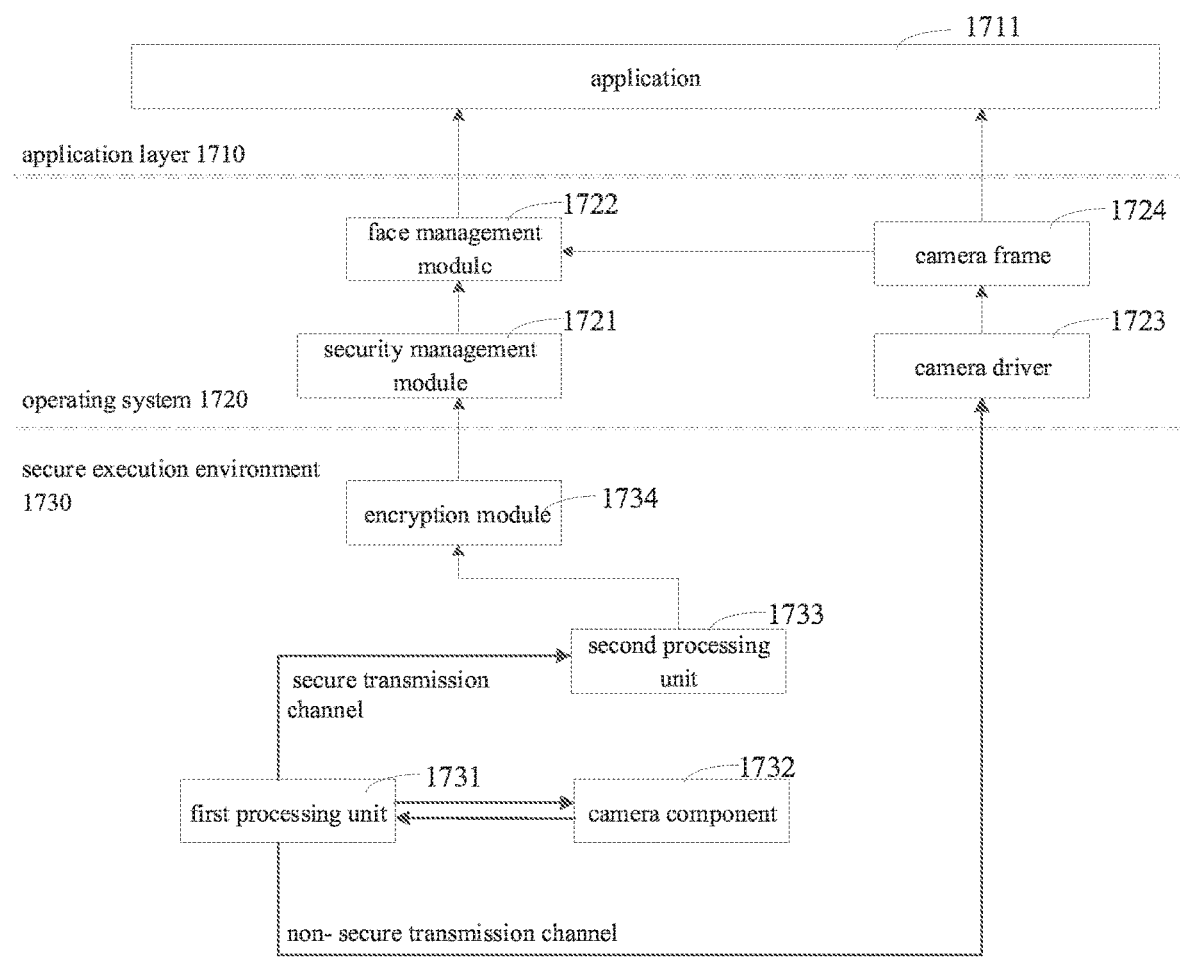
FIG. 17 illustrates a software architecture diagram of realizing an image processing method according to an embodiment of the present disclosure.

FIG. 17 illustrates a software architecture diagram of realizing an image processing method according to an embodiment of the present disclosure. As illustrated in FIG. 17, the software architecture includes an application layer 1710, an operating system 1720, and a secure execution environment 1730. Modules in the secure execution environment 1730 includes a first processing unit 1731, a camera component 1732, a second processing unit 1733, and an encryption module 1734. The operating system 1730 includes a security management module 1721, a face management module 1722, and a camera driver 1723 and a camera frame 1724. The application layer 1710 includes an application 1711. The application 1711 may initiate an image acquisition instruction and transmit the image acquisition instruction to the first processing unit 1731 for processing. For example, when performing operations such as paying, unlocking, beauty, and augmented reality (AR) by collecting a face, the application initiates an image acquisition instruction for collecting a face image. It should be understood that the instruction initiated by the application 1711 may be first transmitted to the second processing unit 1733 and then transmitted by the second processing unit 1733 to the first processing unit 1731.

After receiving the image capturing instruction, the first processing unit 1731 controls the camera component 1732 to collect the infrared image and the speckle image based on the image acquisition instruction. The infrared image and the speckle image collected by the camera component 1732 are transmitted to the first processing unit 1731. The first processing unit 1731 stores the reference image, calculate the depth image including the depth information based on the speckle image and the reference image, calculate the depth parallax image based on the depth image, and calculate the infrared parallax image based on the infrared image. The depth parallax image and the infrared parallax image are then transmitted to the second processing unit 1733 through the secure transmission channel. The second processing unit 1733 performs correction based on the infrared parallax image to acquire a corrected infrared image, and performs correction based on the depth parallax image to acquire a corrected depth image. Face authentication is performed based on the corrected infrared image. It is detected whether there is a face in the corrected infrared image, and whether the detected face matches the stored face. If the face authentication passes, the liveliness detection is performed based on the corrected infrared image and the corrected depth image to determine whether the face is a living face. The face recognition result acquired by the second processing unit 1733 may be transmitted to the encryption module 1734. After being encrypted by the encryption module 1734, the encrypted face recognition result is transmitted to the security management module 1721. Generally, different applications 1711 have corresponding security management modules 1721. The security management module 1721 decrypts the encrypted face recognition result, and transmits the face recognition result acquired after the decryption to the corresponding face management module 1722. The face management module 1722 transmits the face recognition result to the upper-layer application 1711. The application 1711 performs corresponding operations based on the face recognition result.

If the application operation corresponding to the image acquisition instruction received by the first processing unit 1731 is a non-secure operation (such as a beauty, AR operation), the first processing unit 1731 may control the camera component 1732 to collect the speckle image, and calculate the depth image based on the speckle image and the reference image, and acquire the depth parallax image based on the depth image. The first processing unit 1731 transmits the depth parallax image to the camera driver 1723 through the non-secure transmission channel. The camera driver 1723 performs correction based on the depth parallax image to acquire a corrected depth image, and transmits the corrected depth image to the camera frame 1724. The camera frame 1724 transmits the corrected depth image to the face management module 1722 or the application 1711.

Figure 18:
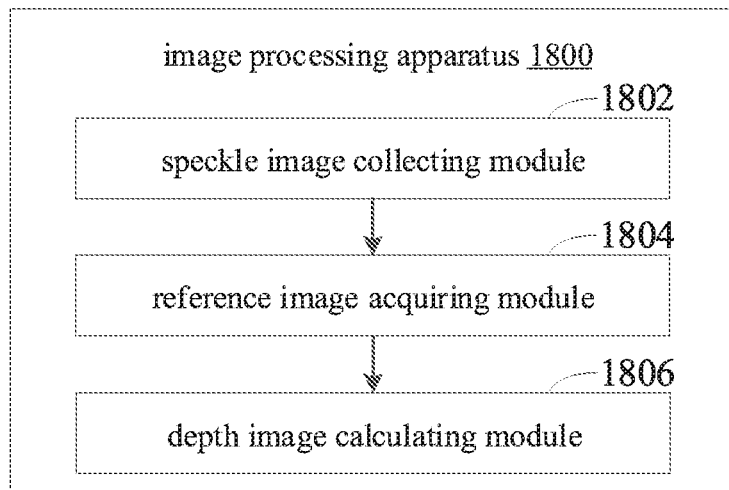
FIG. 18 illustrates a block diagram of an image processing apparatus according to an embodiment of the present disclosure.

FIG. 18 illustrates a block diagram of an image processing apparatus according to an embodiment of the present disclosure. As illustrated in FIG. 18, the image processing apparatus 1800 may include a speckle image collecting module 1802, a reference image acquiring module 1804, and a depth image calculating module 1806.

The speckle image collecting module 1802 is configured to, in response to detecting that a camera component is turned on, control the camera component to collect a speckle image, the speckle image being an image formed by illuminating an object with laser speckles.

The reference image acquiring module 1804 is configured to detect a target temperature of the camera component, and to acquire a corresponding reference image based on the target temperature, the reference image being an image with reference depth information and collected when calibrating the camera component.

The depth image calculating module 1806 is configured to calculate based on the speckle image and the reference image to acquire a depth image.

With the image processing apparatus provided in the above embodiment, when it is detected that the camera component is turned on, the camera component may be controlled to collect the speckle image. Then, the temperature of the camera component is detected, and the reference image is acquired based on the temperature of the camera component. Finally, based on the acquired speckle image and the reference image, the depth image is acquired. This allows different reference images to be taken at different temperatures. The depth images may be calculated based on the corresponding reference images at different temperatures, thereby reducing image errors caused by a change of temperature and improving the accuracy of image processing.

In an embodiment, the speckle image collecting module 1802 is further configured to, in response to a first processing unit detecting an image acquisition instruction, acquire a timestamp carried in the image acquisition instruction, the timestamp being configured to indicate a time when the image acquisition instruction is initiated; to control the camera component to turn on in response to that a duration from the timestamp to a target time is less than a duration threshold, the target time being configured to indicate a time when the image acquisition instruction is detected.

In an embodiment, the reference image acquiring module 1804 is further configured to control a temperature of the camera component to a specified temperature when calibrating the camera component; control the camera component to collect the reference image under the specified temperature; to establish a correspondence between the specified temperature and the reference image; and to acquire a difference between the target temperature and each specified temperature, and acquire the reference image corresponding to the specified temperature with the smallest difference.

In an embodiment, the reference image acquiring module 1804 is further configured to acquire via a second processing unit the target temperature of the camera component, and transmit via the second processing unit the target temperature to a first processing unit; and acquire the corresponding reference image via the first processing unit based on the target temperature.

In an embodiment, the reference image acquiring module 1804 is further configured to acquire an identifier of the camera component, and acquire the corresponding reference image based on the target temperature and the identifier.

In an embodiment, the depth image calculating module 1806 is further configured to the reference image with the speckle image to acquire offset information for indicating a horizontal offset of a speckle in the speckle image relative to a corresponding speckle in the reference image; and to calculate based on the offset information and the reference depth information to acquire the depth image.

In an embodiment, the depth image calculating module 1806 is further configured to acquire an application level corresponding to a target application that initiates the image acquisition instruction, and adjusting an accuracy of the depth image based on the application level to acquire an adjusted depth image; and transmit the adjusted depth image to the target application.

Figure 19:
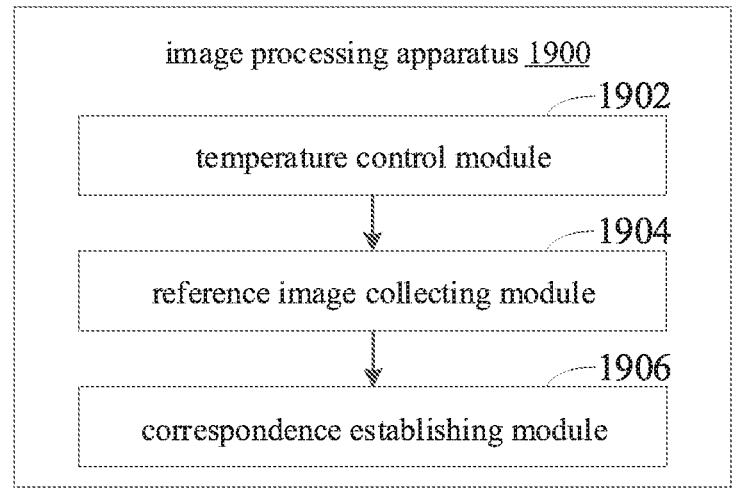
FIG. 19 illustrates a block diagram of an image processing apparatus according to an embodiment of the present disclosure.

FIG. 19 illustrates a block diagram of an image processing apparatus according to an embodiment of the present disclosure. As illustrated in FIG. 19, the image processing apparatus 1900 includes a temperature control module 1902, a reference image collecting module 1904, and a correspondence establishing module 1906.

The temperature control module 1902 is configured to control a temperature of a camera component to reach a specified temperature.

The reference image collecting module 1904 is configured to control the camera component to collect a reference image under the specified temperature, the reference image being an image with reference depth information.

The correspondence establishing module 1906 is configured to establish a correspondence between the specified temperature and the reference image.

With the image processing apparatus provided in the above embodiment, different reference images at different temperatures during the calibration of the camera component may be collected. When acquiring the speckle image, the reference image may be acquired based on the temperature of the camera component, and finally the depth image is acquired based on the speckle image and the reference image. In this way, the camera component may acquire different reference images at different temperatures. The depth images may be calculated based on the corresponding reference images at different temperatures, thereby reducing image errors caused by temperature changes and improving the accuracy of image processing.

In an embodiment, the temperature control module 1902 is further configured to control a laser lamp to operate at a specified frequency, and control the temperature of the camera component to reach the specified temperature by the laser lamp operating at the specified frequency.

In an embodiment, the temperature control module 1902 is further configured to output a pulse signal with the specified frequency via a first processing unit, and control the laser lamp to operate at the specified frequency by the pulse signal with the specified frequency.

In an embodiment, the correspondence establishing module 1906 is further configured to acquire an identifier of the camera component, and establish a correspondence among the specified temperature, the identifier of the camera component and the reference image.

In an embodiment, the correspondence establishing module 1906 is further configured to store the reference image and the corresponding specified temperature into a first processing unit in a secure execution environment.

With reference to FIG. 19 again, as illustrated in FIG. 19, the image processing apparatus 1900 includes a temperature control module 1902, a reference image collecting module 1904, and a correspondence establishing module 1906.

The temperature control module 1902 is configured to control the temperature of the camera component to the specified temperature, the camera component comprising a light emitter and a camera.

The reference image collecting module 1904 is configured to control the camera component to collect the reference image formed when the light emitter illuminates a reference plane at the specified temperature.

The correspondence establishing module 1906 is configured to store the specified temperature and the reference image correspondingly, the reference image having the reference depth information, the reference depth information being configured to calculate depth information of an object.

With the image processing apparatus provided in the above embodiment, the temperature of the camera component may be controlled to reach at least two different specified temperatures, and to collect the reference images formed at different specified temperatures. The reference images and specified temperatures are stored correspondingly. Since the camera component will deform at different temperatures, and the temperature itself will affect the image captured by the camera component, the camera component is controlled to capture images at different specified temperatures when calibrating the camera. In this way, the corresponding reference image may be acquired based on the temperature of the camera component, and the depth information of the object may be calculated based on the reference depth information in the reference image, thereby avoiding the error caused by the change of temperature of the camera component, and improving the accuracy of image processing.

Figure 20:
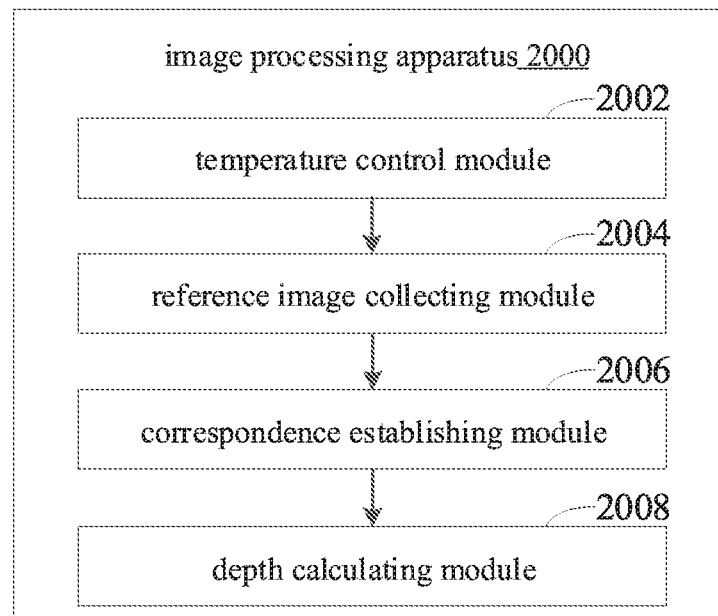
FIG. 20 illustrates a block diagram of an image processing apparatus according to an embodiment of the present disclosure.

FIG. 20 illustrates a block diagram of an image processing apparatus according to an embodiment of the present disclosure. As illustrated in FIG. 20, the image processing apparatus 2000 a temperature control module 2002, a reference image collecting module 2004, a correspondence establishing module 2006, and a depth calculating module 2008.

The temperature control module 1902 is configured to control the temperature of the camera component to the specified temperature, the camera component comprising a light emitter and a camera.

The reference image collecting module 1904 is configured to control the camera component to collect the reference image formed when the light emitter illuminates a reference plane at the specified temperature.

The correspondence establishing module 1906 is configured to store the specified temperature and the reference image correspondingly, the reference image having the reference depth information, the reference depth information being configured to calculate depth information of an object.

The depth calculating module 2008 is configured to control, in response to detecting that the camera component is turned on, control the camera component to collect a speckle image; in response to detecting a change of temperature of the light emitter exceeding a temperature threshold, acquire a current temperature of the light emitter; and acquire a corresponding reference image based on the current temperature of the light emitter, and calculating a depth image based on the speckle image and the reference image, the depth image being configured to indicate depth information of an object.

With the image processing apparatus provided in the above embodiment, the corresponding reference image may be acquired based on the temperature of the camera component, and the depth information of the object is calculated based on the reference depth information in the reference image, thereby avoiding the error caused by the change of temperature of the camera component, and improving the accuracy of image processing.

In an embodiment, the temperature control module 1902 is configured to input at least two pulse width modulations (PWMs) with different frequencies to the light emitter, and control the temperature of the light emitter to reach the at least two different specified temperatures by the at least two PWMs.

In an embodiment, the correspondence establishing module 2006 is configured to establish the correspondence between the specified temperature and the reference image, and write the specified temperature and the reference image into a secure execution environment of a terminal for storage.

In an embodiment, the correspondence establishing module 2006 is configured to write the specified temperature and the reference image into a first secure execution environment of the terminal for storage; and in response to detecting that the terminal is powered on, load the specified temperature and the reference image from the first secure execution environment into a second secure execution environment for storage.

In an embodiment, the correspondence establishing module 2006 is configured to acquire an identifier of the camera component, and establishing a correspondence among the identifier, the specified temperature, and the reference image; and store the identifier, the specified temperature, and the reference image into a server.

In an embodiment, the correspondence establishing module 2006 is configured to acquire the corresponding specified temperature and the reference image based on an identifier carried in a reference image acquisition request in response to that the server receives the reference image acquisition request from the terminal.

The division of each module in the above image processing apparatus is for illustrative purposes only. In other embodiments, the image processing apparatus may be divided into different modules as needed to complete all or part of the functions of the image processing apparatus.

Figure 21:
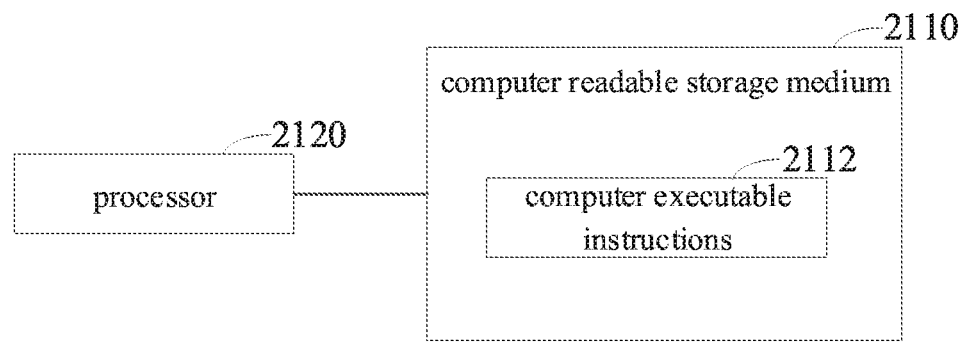
FIG. 21 illustrates a block diagram of a computer readable storage medium according to an embodiment of the present disclosure.

Referring to FIG. 21, an embodiment of the present disclosure further provides a computer readable storage medium 2110. One or more non-transitory computer readable storage media 2110 includes computer executable instructions 2112 that, when executed by one or more processors 2120, cause the processor 2120 to perform the above-described image processing method provided in the above embodiments.

A computer program product includes instructions which, when run on a computer, cause the computer to perform the image processing method provided in the above embodiments.

Any reference to a memory, storage, database or other medium used herein may include non-volatile and/or volatile memory. Suitable non-volatile memories may include a read only memory (ROM), a programmable ROM (PROM), an erasable programmable ROM (EPROM), an electrically erasable programmable ROM (EEPROM), or a flash memory. Volatile memory may include a random-access memory (RAM), which acts as an external cache. By way of illustration and not limitation, RAM is available in a variety of formats, such as static RAM (SRAM), dynamic RAM (DRAM), synchronous DRAM (SDRAM), double data rate SDRAM (DDR SDRAM), enhanced SDRAM (ESDRAM), synch link DRAM (SLDRAM), rambus direct RAM (RDRAM), direct memory bus dynamic RAM (DRDRAM), and memory bus dynamic RAM (RDRAM).

The above-mentioned embodiments are merely illustrative of several embodiments of the present disclosure, and the description thereof is more specific and detailed, but is not to be construed as limiting the scope of the claims. It should be noted that a number of variations and modifications may be made by those skilled in the art without departing from the spirit and scope of the present disclosure. Therefore, the scope of the invention should be determined by the appended claims.

What is claimed is:

1. A method for image processing, comprising:
   in response to detecting that a camera component is turned on, controlling the camera component to collect a speckle image of an object that is illuminated with laser speckles;
   detecting a current temperature of the camera component;
   acquiring a reference image with reference depth information based on the current temperature and a preset correspondence between reference images and specified temperatures, comprising:
      acquiring differences between the current temperature and each specified temperature; and
      acquiring the reference image corresponding to the specified temperature with the smallest difference;
   calculating based on the speckle image and the acquired reference image to acquire a depth image; and
   establishing the preset correspondence between reference images and specified temperatures, comprising:
      controlling a temperature of the camera component to reach each specified temperature;
      controlling the camera component to collect a reference image under each specified temperature; and
      establishing the correspondence between the specified temperatures and the reference images.

2. The method of claim 1, wherein controlling the camera component comprises:
   controlling the camera component by a first processing unit that is an external processing unit with respect to a central processing unit.

3. The method of claim 2, wherein detecting the current temperature of the camera component comprises:
   detecting, by a temperature sensor, the current temperature of the camera component;
   acquiring, by a second processing unit, the detected current temperature of the camera component from the temperature sensor, the second processing unit is a processing unit located in a trusted execution environment of the central processing unit; and
   transmitting, by the second processing unit, the detected current temperature of the camera component to the first processing unit.

4. The method of claim 3, wherein acquiring the reference image with reference depth information based on the current temperature and the preset correspondence comprising:
   acquiring, by the first processing unit, the reference image with reference depth information based on the current temperature and the preset correspondence.

5. The method of claim 4, wherein calculating based on the speckle image and the acquired reference image to acquire the depth image comprises:
calculating, by the first processing unit, based on the speckle image and the acquired reference image to acquire the depth image; and
transmitting, by the first processing unit, the depth image to the second processing unit.

6. The method of claim 1, further comprising:
in response to detecting an image acquisition instruction, acquiring a timestamp carried in the image acquisition instruction, the timestamp being configured to indicate a time when the image acquisition instruction is initiated; and
controlling the camera component to turn on in response to that a duration from the timestamp to a target time is less than a duration threshold, the target time being configured to indicate a time when the image acquisition instruction is detected.

7. The method of claim 1, further comprising:
acquiring an identifier of the camera component; and
acquiring the preset correspondence corresponding to the identifier.

8. The method of claim 1, wherein calculating based on the speckle image and the acquired reference image to acquire the depth image comprises:
comparing the acquired reference image with the speckle image to acquire offset information for indicating a horizontal offset of a speckle in the speckle image relative to a corresponding speckle in the reference image; and
calculating based on the offset information and the reference depth information to acquire the depth image.

9. The method of claim 6, further comprising:
acquiring an application level corresponding to a target application that initiates the image acquisition instruction;
adjusting an accuracy of the depth image based on the application level to acquire an adjusted depth image; and
transmitting the adjusted depth image to the target application.

10. The method of claim 1, further comprising:
storing the preset correspondence between reference images and specified temperatures into a first processing unit that is an external processing unit with respect to a central processing unit.

11. The method of claim 1, further comprising:
storing the preset correspondence between reference images and specified temperatures into a first processing unit that is an external processing unit with respect to a central processing unit; and
in response to detecting that a terminal is powered on, loading the preset correspondence between reference images and specified temperatures from the first processing unit into a second processing unit, the second processing unit is a processing unit located in a trusted execution environment of the central processing unit.

12. The method of claim 1, wherein the camera component comprises a laser lamp and a camera, and controlling the temperature of the camera component to reach each specified temperature comprises:
controlling the laser lamp to operate at a specified frequency to control the temperature of the camera component to each the specified temperature.

13. The method of claim 1, further comprising:
acquiring an identifier of the camera component; and
associating the identifier of the camera component to the preset correspondence.

14. The method of claim 1, further comprising:
acquiring an identifier of the camera component;
associating the identifier of the camera component to the preset correspondence; and storing the identifier, and the preset correspondence into a server.

15. The method of claim 14, further comprising:
transmitting a request for acquiring the preset correspondence to server, the request carrying the identifier of the camera component; and
receiving the preset correspondence from the server based on the identifier of the camera component carried in the request.

16. A non-transitory computer readable storage medium having stored thereon computer programs executed by a processor to carry out:
in response to detecting that a camera component is turned on, controlling the camera component to collect a speckle image of an object that is illuminated with laser speckles;
detecting a current temperature of the camera component;
acquiring a reference image with reference depth information based on the current temperature and a preset correspondence between reference images and specified temperatures, comprising:
acquiring differences between the current temperature and each specified temperature; and
acquiring the reference image corresponding to the specified temperature with the smallest difference;
calculating based on the speckle image and the acquired reference image to acquire a depth image; and
establishing the preset correspondence between reference images and specified temperatures, comprising:
controlling a temperature of the camera component to reach each specified temperature;
controlling the camera component to collect a reference image under each specified temperature; and
establishing the correspondence between the specified temperatures and the reference images.

17. An electronic device comprising a memory and a processor, the memory storing computer readable instructions, the computer readable instructions being executed by the processor, causing the processor to:
in response to detecting that a camera component is turned on, control the camera component to collect a speckle image of an object that is illuminated with laser speckles;
detect a current temperature of the camera component;
acquire a reference image with reference depth information based on the current temperature and a preset correspondence between reference images and specified temperatures, comprising:
acquire differences between the current temperature and each specified temperature; and
acquire the reference image corresponding to the specified temperature with the smallest difference;
calculate based on the speckle image and the acquired reference image to acquire a depth image; and
establish the preset correspondence between reference images and specified temperatures, by actions of:
controlling a temperature of the camera component to reach each specified temperature;
controlling the camera component to collect a reference image under each specified temperature; and establishing the correspondence between the specified temperatures and the reference images.

\* \* \* \* \*